US012552587B2

(12) United States Patent
Langley et al.

(10) Patent No.: US 12,552,587 B2
(45) **Date of Patent: *Feb. 17, 2026**

(54) CLAM SHELL COVER CAP AND METHOD OF USE

(71) Applicant: RxGuardian Inc., Sacramento, CA (US)

(72) Inventors: Nathan Langley, Sacramento, CA (US); Joseph C. Simpson, Sacramento, CA (US)

(73) Assignee: RxGuardian Inc., Sacramento, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/542,555

(22) Filed: Dec. 15, 2023

(65) Prior Publication Data

US 2024/0140667 A1 May 2, 2024

Related U.S. Application Data

(63) Continuation of application No. 17/699,788, filed on Mar. 21, 2022, now Pat. No. 11,845,597, and a continuation of application No. 17/584,199, filed on Jan. 25, 2022, now Pat. No. 11,845,596, said application No. 17/699,788 is a continuation of application No. 16/937,363, filed on Jul. 23, 2020, now Pat. No. 11,279,535, said application No.

(Continued)

(51) Int. Cl.

*B65D 55/14* (2006.01)
*A61J 1/03* (2023.01)

(52) U.S. Cl.

CPC .............. *B65D 55/145* (2013.01); *A61J 1/03* (2013.01)

(58) Field of Classification Search

CPC .... B65D 51/245; B65D 55/145; B65D 50/06; B65D 47/265; B65D 2215/04; B65D 55/14; B65D 2215/02; A61J 1/03; A61J 1/1437

See application file for complete search history.

(56) References Cited

U.S. PATENT DOCUMENTS 684,656 A 10/1901 Watson
1,071,991 A 9/1913 Ebert (Continued)

FOREIGN PATENT DOCUMENTS

CN 2646078 Y 10/2004
CN 2897860 Y 5/2007

(Continued)

OTHER PUBLICATIONS

Daesung Hi-Tech Ltd., "A Korean Company Offers Devices Over the Internet for Airtight Reclosing of Pouches Under the Trademarks Anylock, Coolock, and Carrylock," 4 pages, [Retrieved on May 1, 2018] Retrieved from URL: http://www.anylock.co.kr.

(Continued)

*Primary Examiner* — Shawn M Braden

(74) *Attorney, Agent, or Firm* — Regis C. Worley, Jr.; Cozen O'Connor

(57) ABSTRACT

A clam shell cover cap device is a lockable closure which fits over existing medication vials used in the pharmacy and medical industries. It comes preset, with a random combination. The combination is marked with an indicator sticker. The clam Shell Cover Cap may be used to lock a vial.

20 Claims, 20 Drawing Sheets

Related U.S. Application Data

17/584,199 is a continuation of application No. 16/937,363, filed on Jul. 23, 2020, now Pat. No. 11,279,535, which is a continuation-in-part of application No. 16/933,670, filed on Jul. 20, 2020, now Pat. No. 11,267,625, which is a continuation of application No. 16/294,869, filed on Mar. 6, 2019, now Pat. No. 10,717,571.

(60) Provisional application No. 62/639,162, filed on Mar. 6, 2018.

(56) References Cited

U.S. PATENT DOCUMENTS 1,082,906 A 12/1913 Potts
1,358,352 A 11/1920 Addison
1,361,605 A 12/1920 Morrill
1,683,294 A 9/1928 Edgar
1,803,217 A 4/1931 Clare
1,986,057 A 1/1935 Hackworth
2,009,216 A 7/1935 Anibal
2,017,698 A 10/1935 Joseph
2,064,432 A 12/1936 Frank
2,136,598 A 11/1938 Strayer
2,616,470 A 11/1952 Jacob
3,141,221 A 7/1964 Faulls, Jr.
3,151,756 A 10/1964 John
3,200,868 A 8/1965 Strayer
3,266,711 A 8/1966 Song
3,394,959 A 7/1968 Marguerite
3,421,347 A 1/1969 Sotory
3,426,932 A 2/1969 Rouse
3,445,021 A 5/1969 Johnson
3,481,007 A 12/1969 Scarritt, Jr.
3,669,296 A 6/1972 Drew et al.
3,684,117 A 8/1972 Leopoldi et al.
3,702,169 A 11/1972 Bonneville et al.
3,843,007 A 10/1974 Meyer
3,850,324 A 11/1974 Meyer
3,901,407 A 8/1975 Mitchell et al.
3,998,078 A 12/1976 Detwiler
4,302,956 A 12/1981 McMorrow et al.
4,366,687 A 1/1983 Atkinson
4,383,425 A 5/1983 Orabona
4,445,348 A 5/1984 Saitoh
4,520,641 A 6/1985 Bako
4,615,191 A 10/1986 Grandy
4,787,222 A 11/1988 Irazoqui et al.
4,794,768 A 1/1989 Moser et al.
4,829,796 A 5/1989 Kim
4,871,264 A 10/1989 Robbins, III et al.
4,907,430 A 3/1990 Hong
4,984,698 A 1/1991 Stuckey
5,050,272 A 9/1991 Robinson et al.
5,142,888 A 9/1992 Ling
D331,364 S 12/1992 Barker et al.
5,277,325 A 1/1994 Yan
5,284,262 A 2/1994 O'Nan
5,379,489 A 1/1995 Delk et al.
5,429,263 A 7/1995 Haubenwallner
5,493,279 A 2/1996 Dawson et al.
D372,674 S 8/1996 Weber et al.
D376,691 S 12/1996 Naas et al.
5,613,282 A 3/1997 Deddens, Sr. et al.
5,619,775 A 4/1997 Klinck
5,636,539 A 6/1997 Tsai
5,681,115 A 10/1997 Diederich et al.
5,713,108 A 2/1998 Solomon et al.
5,735,422 A 4/1998 Binter
5,797,683 A 8/1998 Gunzi et al.
5,799,792 A 9/1998 Abrums
5,875,657 A 3/1999 Kelley
5,899,099 A 5/1999 Tsai
5,911,764 A 6/1999 Wei Kong
5,913,456 A 6/1999 Dikeman
5,983,460 A 11/1999 Hyde et al.
6,074,094 A 6/2000 Manolizi et al.
6,290,393 B1 9/2001 Tomic
6,386,005 B1 5/2002 Kuo
6,688,146 B2 2/2004 Michels et al.
6,702,169 B2 3/2004 Eipper
6,786,346 B1 9/2004 Gurnard et al.
6,793,081 B1 9/2004 Derman
6,912,878 B2 7/2005 Belden, Jr.
6,988,642 B2 1/2006 Gallo, Jr. et al.
7,107,803 B1 9/2006 Swanson
7,243,515 B2 7/2007 Meyer
7,252,204 B1 8/2007 Small
7,337,637 B2 3/2008 Kan
7,347,325 B2 3/2008 O'Neill et al.
7,350,655 B2 4/2008 Belden, Jr.
7,412,854 B2 8/2008 Raemisch et al.
7,503,696 B2 3/2009 Ha et al.
7,549,541 B2 6/2009 Brozell et al.
7,617,935 B2 11/2009 Reilley et al.
7,677,065 B1 3/2010 Miao
7,891,220 B2 2/2011 Yen et al.
8,020,415 B2 9/2011 Corbin et al.
8,297,087 B1 10/2012 Lin
8,413,811 B1 4/2013 Arendt
8,517,193 B1 8/2013 Small
8,662,330 B2 3/2014 Simpson
8,666,539 B2 3/2014 Ervin
8,763,553 B1 * 7/2014 Shannehan ............... A61J 7/04
116/308
8,875,915 B2 11/2014 Serell
8,931,652 B2 1/2015 Simpson
8,938,999 B2 1/2015 Dahl
8,939,301 B1 1/2015 Small
8,944,263 B1 2/2015 Small
9,078,502 B2 7/2015 Fily et al.
9,133,649 B2 9/2015 Taylor et al.
D741,713 S 10/2015 Serell
D742,116 S 11/2015 Serell
D746,058 S 12/2015 Serell
9,199,773 B2 12/2015 Simpson
D747,606 S 1/2016 Serell
D747,607 S 1/2016 Serell
9,278,789 B2 3/2016 Simpson
9,367,984 B2 6/2016 Daugbjerg et al.
D761,008 S 7/2016 Lande
9,452,872 B2 9/2016 Simpson
9,555,942 B2 1/2017 Ackerman
9,573,743 B2 2/2017 Simpson
9,758,989 B1 9/2017 Simpson
9,764,882 B2 9/2017 Simpson
9,890,558 B2 2/2018 Serell
10,037,640 B2 7/2018 Gordon
10,145,492 B2 12/2018 Ayala, Jr. et al.
10,180,018 B1 1/2019 Simpson et al.
10,279,969 B2 5/2019 Simpson
10,335,349 B2 7/2019 Roslyakov et al.
10,472,857 B2 11/2019 Simpson
10,717,571 B1 7/2020 Simpson et al.
11,008,777 B2 5/2021 Simpson
11,238,682 B2 2/2022 Poddar
11,262,148 B1 3/2022 Lessie et al.
11,279,535 B1 3/2022 Simpson et al.
2002/0170639 A1 11/2002 Steinberg
2003/0089145 A1 5/2003 Michels et al.
2003/0188510 A1 10/2003 Vargas
2004/0011098 A1 1/2004 Yang
2004/0163430 A1 8/2004 Belden
2004/0234173 A1 11/2004 Saad et al.
2005/0050853 A1 3/2005 Byron et al.
2005/0278186 A1 12/2005 de la Huerga
2006/0037370 A1 2/2006 Bright
2006/0207958 A1 9/2006 Hamer
2007/0023317 A1 2/2007 Brozell et al.
2007/0131007 A1 6/2007 Hacker
2008/0098939 A1 5/2008 Kalous et al.
2008/0302794 A1 12/2008 Wagner et al.
2009/0108016 A1 4/2009 Brown et al.

(56) References Cited

U.S. PATENT DOCUMENTS

| | | | |
|---|---|---|---|
| 2010/0307208 | A1 | 12/2010 | Corbin et al. |
| 2011/0021036 | A1 | 1/2011 | Braecklmann et al. |
| 2011/0049079 | A1 | 3/2011 | Simpson |
| 2011/0049080 | A1 | 3/2011 | Simpson |
| 2011/0079058 | A1 | 4/2011 | Nielsen et al. |
| 2011/0210136 | A1 | 9/2011 | Wang |
| 2012/0168461 | A1 | 7/2012 | Topits et al. |
| 2012/0267369 | A1 | 10/2012 | Duvigneau |
| 2013/0043204 | A1 | 2/2013 | Simpson |
| 2013/0062303 | A1 | 3/2013 | Serell |
| 2013/0134121 | A1 | 5/2013 | Dahl |
| 2014/0116536 | A1 | 5/2014 | Resendiz |
| 2014/0158558 | A1 | 6/2014 | Ye |
| 2014/0175041 | A1 | 6/2014 | Simpson |
| 2014/0360969 | A1 | 12/2014 | Ackerman |
| 2015/0351513 | A1 | 12/2015 | Park, II |
| 2016/0083157 | A1 | 3/2016 | Simpson |
| 2016/0185497 | A1 | 6/2016 | Simpson |
| 2017/0001777 | A1 | 1/2017 | Simpson |
| 2017/0137190 | A1 | 5/2017 | Simpson |
| 2017/0356217 | A1 | 12/2017 | Simpson |
| 2018/0051488 | A1 | 2/2018 | Simpson et al. |
| 2018/0061157 | A1 | 3/2018 | Zielkowski et al. |
| 2018/0079569 | A1 | 3/2018 | Simpson et al. |
| 2019/0104876 | A1 | 4/2019 | Loures et al. |
| 2020/0024866 | A1 | 1/2020 | Hartmann et al. |
| 2020/0040606 | A1 | 2/2020 | Simpson |
| 2020/0062472 | A1 | 2/2020 | Simpson |
| 2020/0346826 | A1 | 11/2020 | Simpson et al. |
| 2021/0340792 | A1 | 11/2021 | Simpson |
| 2021/0354891 | A1 | 11/2021 | Netter |

FOREIGN PATENT DOCUMENTS

| | | | |
|---|---|---|---|
| CN | 201143150 | Y | 11/2008 |
| CN | 103043295 | A | 4/2013 |
| GB | 495955 | A | 11/1938 |
| WO | WO-9521982 | A1 | 8/1995 |
| WO | WO-9857863 | A1 | 12/1998 |
| WO | WO-0208078 | A2 | 1/2002 |
| WO | WO-2004103827 | A2 | 12/2004 |
| WO | WO-2006058418 | A1 | 6/2006 |
| WO | WO-2010078898 | A1 | 7/2010 |
| WO | WO-2012112633 | A1 | 8/2012 |

OTHER PUBLICATIONS

Extended European Search Report for European Application No. 10814459.3, mailed Dec. 20, 2012, 4 pages.

International Search Report and Written Opinion for International Application No. PCT/US2010/047589, mailed Oct. 22, 2010, 9 pages.

International Search Report and Written Opinion for International Application No. PCT/US2017/047651, mailed Oct. 27, 2017, 8 pages.

International Search Report and Written Opinion for International Application No. PCT/US2017/058959, mailed Jan. 17, 2018, 7 pages.

U.S. Appl. No. 12/573,799 / U.S. Pat. No. 8,662,330, filed Oct. 5, 2009 / Mar. 4, 2014.

U.S. Appl. No. 12/730,812 / U.S. Pat. No. 8,931,652, filed Mar. 24, 2010 / Jan. 13, 2015.

U.S. Appl. No. 13/585,742 / U.S. Pat. No. 9,199,773, filed Aug. 14, 2012 / Dec. 1, 2015.

U.S. Appl. No. 14/194,335 / U.S. Pat. No. 9,278,789, filed Feb. 28, 2016 / Mar. 8, 2016.

U.S. Appl. No. 14/670,181 / U.S. Pat. No. 9,758,989, filed Mar. 26, 2015 / Sep. 12, 2017.

U.S. Appl. No. 14/954,686 / U.S. Pat. No. 9,452,872, filed Nov. 30, 2015 / Sep. 27, 2016.

U.S. Appl. No. 15/063,403 / U.S. Pat. No. 9,573,743, filed Mar. 7, 2016 / Feb. 21, 2017.

U.S. Appl. No. 15/076,548 / U.S. Pat. No. 10,180,018, filed Mar. 21, 2016 / Jan. 15, 2019.

U.S. Appl. No. 15/240,959, filed Aug. 18, 2016.

U.S. Appl. No. 15/267,994 / U.S. Pat. No. 9,764,882, filed Sep. 16, 2016 / Sep. 19, 2017.

U.S. Appl. No. 15/338,133, filed Oct. 28, 2016.

U.S. Appl. No. 15/420,942 / U.S. Pat. No. 10,279,968, filed Jan. 31, 2017 / May 7, 2019.

U.S. Appl. No. 15/688,750 / U.S. Pat. No. 10,472,857, filed Aug. 28, 2017 / Nov. 12, 2019.

U.S. Appl. No. 16/294,869 / U.S. Pat. No. 10,717,571, filed Mar. 6, 2019 / Jul. 21, 2020.

U.S. Appl. No. 16/397,918 / U.S. Pat. No. 11,273,963, filed Apr. 29, 2019 / Mar. 15, 2022.

U.S. Appl. No. 16/597,804 / U.S. Pat. No. 11,008,777, filed Oct. 9, 2019 / May 18, 2021.

U.S. Appl. No. 16/933,670 / U.S. Pat. No. 11,267,625, filed Jul. 20, 2020 / Mar. 8, 2022.

U.S. Appl. No. 16/937,363 / U.S. Pat. No. 11,279,535, filed Jul. 23, 2020 / Mar. 22, 2022.

U.S. Appl. No. 17/322,830, filed May 17, 2021.

U.S. Appl. No. 17/584,199 / U.S. Pat. No. 11,845,596, filed Jan. 25, 2022 / Dec. 19, 2023.

U.S. Appl. No. 17/699,788 / U.S. Pat. No. 11,845,597, filed Mar. 21, 2022 / Dec. 19, 2023.

* cited by examiner

1010A

CLAM SHELL COVER CAP AND METHOD OF USE

RELATED APPLICATIONS/PRIORITY CLAIMS

This application is a continuation of and claims priority under 35 USC 120 to U.S. patent application Ser. No. 17/699,788 filed Mar. 21, 2022 (now U.S. Pat. No. 11,845,597 issued on Dec. 19, 2023) and to U.S. patent application Ser. No. 17/584,199 filed Jan. 25, 2022 (now U.S. Pat. No. 11,845,596 issued on Dec. 19, 2023) that is a continuation of and claims priority under 35 USC 120 to U.S. patent application Ser. No. 16/937,363 filed Jul. 23, 2020 (now U.S. Pat. No. 11,279,535 issued on Mar. 22, 2022) that is a continuation in part of and claims priority under 35 USC 120 to U.S. patent application Ser. No. 16/933,670 filed Jul. 20, 2020 (now U.S. Pat. No. 11,267,625 issued on Mar. 8, 2022) that is a continuation of and claims priority under 35 USC 120 to U.S. patent application Ser. No. 16/294,869 filed on Mar. 6, 2019 (now U.S. Pat. No. 10,717,571 issued on Jul. 21, 2020) and in turn claims the benefit under 35 USC 119(e) and 120 to U.S. Provisional Patent Application Ser. No. 62/639,162, filed on Mar. 6, 2018, entire contents of each of which are incorporated herein by reference.

FIELD

The disclosure relates to a closure lock, in particular to a lock for existing medication vials and bottles.

BACKGROUND

There is need for additional safety and security for some medications. The current vials and closures used for medication storage are not safe enough. Child resistant closures are the only safety measures on some medications. While these may keep some small children from getting into medications, they have little to no effect at keeping a teenager or other unauthorized user out of a medication. This device is designed to limit access to only the person who knows the combination. It surrounds the closure on the vials currently used in the medical field. It allows for greater safety and security of medications through easily locking them up.

DETAILED DESCRIPTION OF ONE OR MORE EMBODIMENTS

The disclosure is particularly applicable to a clam shell cover cap that may be placed over a closed vial, bottle or other container of contents (such as the medicine bottles shown in FIG. 6 that surrounds the closed container to prevent an unauthorized user from accessing the contents of the container and it is in this context that the disclosure will be described. It will be appreciated, however, that the clam shell cover cap may be used for various differently shaped and sized containers with caps that are closed and may further be adapted to be used with various differently shaped containers that are open. The clam shell cover cap device may also be used with other container of various shapes and sizes.

Figure 1:
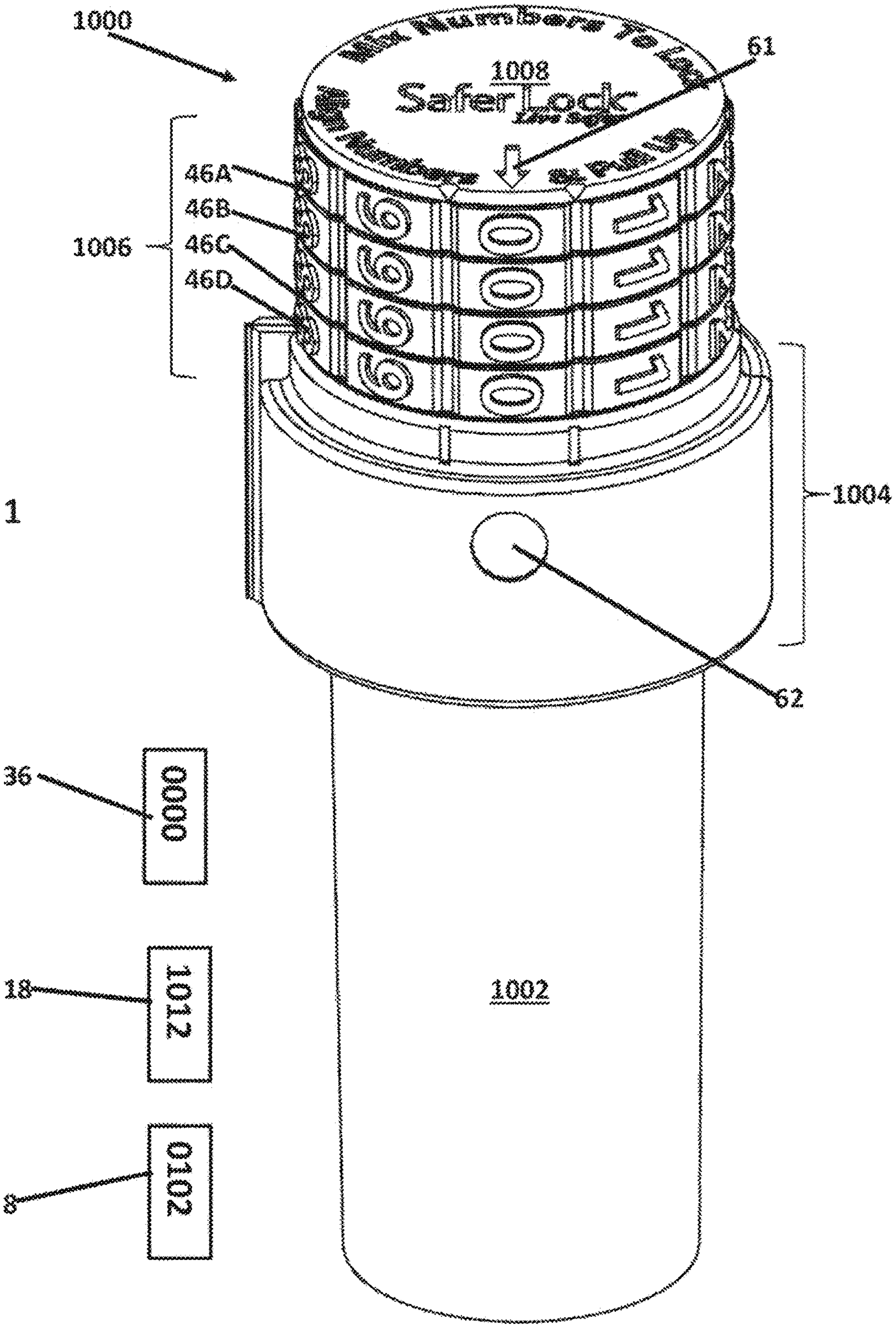
FIG. 1 is a view of a clam shell cover cap device in the closed/down position with the correct combination set.

The disclosure relates to a clam shell cover cap device 1000 that may be fitted over a container 1002 (with or without a cap) and thus prevent unauthorized user (a person that does not know the combination) to access the contents of the container. FIG. 1, FIG. 2, FIG. 3, and FIG. 4 show how the locking cap device 1000 functions when the device is unlocked or locked. The locking cap 1000 may be set to a locking combination once (by a user or a pharmacy worker or a hospital worker) but cannot be reset to a different locking combination as described below in more detail. In the example shown in FIG. 1, the locking cap 1000 is set to "0000", but could also be set to other combinations, such as 1012 or 0102, as shown in FIG. 1. Note that the wheels 46*a*-46*d* of the locking cap 100 may display the numbers as shown in FIG. 1, but the wheels may also display other alphanumeric characters or other symbols that form the combination to unlock the locking cap 1000. In one embodiment, the combination for the locking cap 1000 may be provided to the user (when the user does not set the combination, on a sticker or piece of paper or other indicator 36, 8, 18 as shown in FIG. 1.

Figure 3:
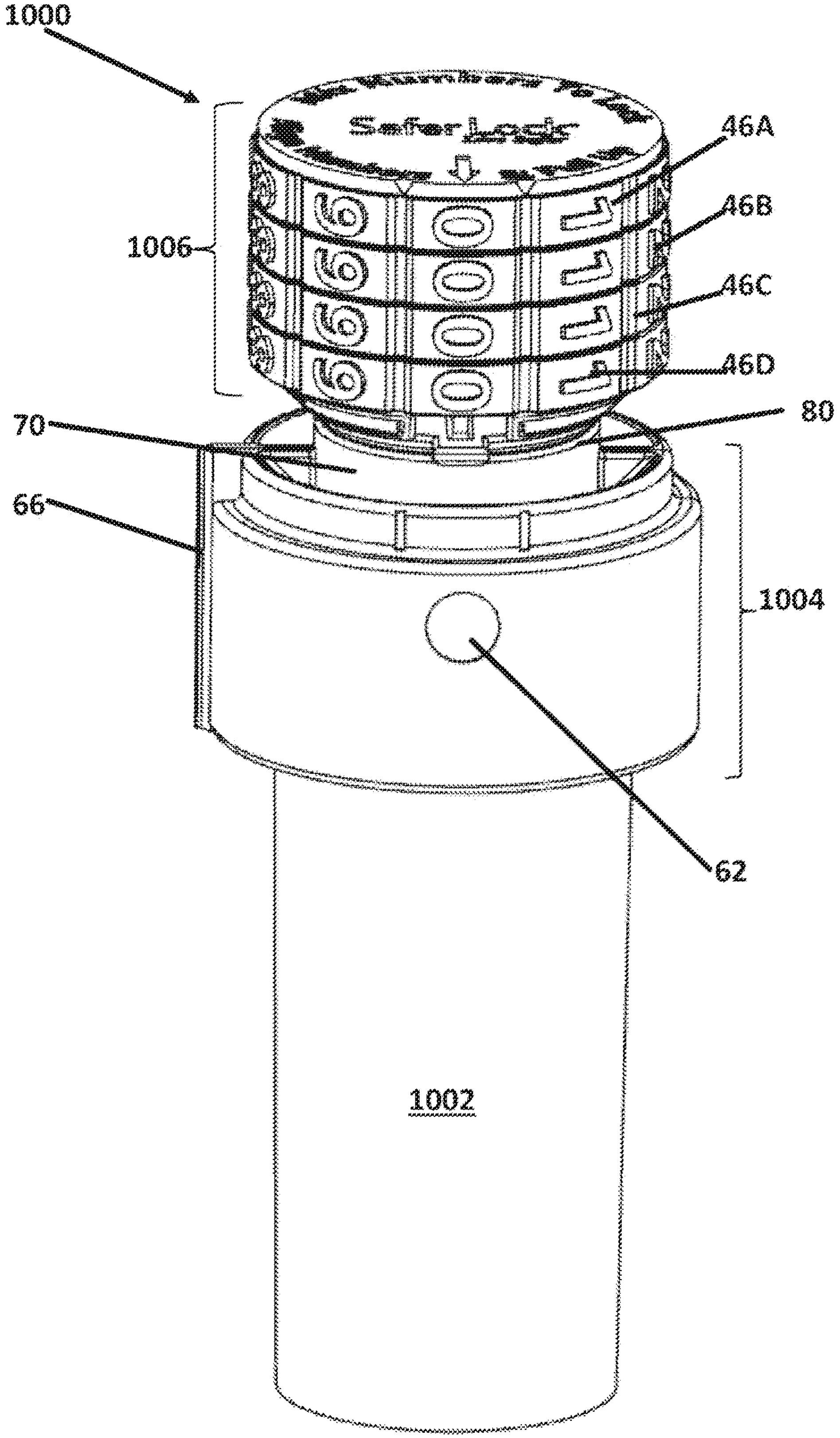
FIG. 3 is a view of the clam shell cover cap device in the closed/up position with the correct combination set.

FIG. 1 illustrates an example of the clam shell cover cap device 1000 in an unlocked, but closed position in which the correct combination (0000 in the example in FIG. 1) is aligned with a set of position indicators 61, 62 so that the device 1000 is open, but the device is in a down position covering the top of the container 1002 as shown in FIG. 1 as compared to the up position in FIG. 3. The clam shell cover cap device 1000 may further comprise a housing portion 1004 that fit over and around the top of the container and a locking portion 1006 connected to the housing portion 1004. Each of the portions of the clam shell cover cap device 1000 may be made out of a suitable plastic material. For example, the portions of the clam shell cover cap device 1000 may be made out of a poly propylene plastic with properties where the plastic is rigid where thick and can hinge many times where thin without breaking. Other materials can also be used, but the properties of propylene make it good due to its flexible and rigid qualities. The clam shell cover cap device 1000 may further comprise a cap portion 1008 that is described below in more detail with reference to FIGS. 8A-8F. The locking portion 1006 may further comprising one or more wheels 46*a*-46*d*, four being shown in the example in the Figures, rotate between an unlocking combination as shown in FIG. 1 and a plurality of locking combinations (being all of the other possible combinations of the symbols of the one or more wheels except for the unlocking combination). Each wheel may have one or more symbols (with numbers in the example shown) and the symbols on each wheel may be rotated around to arrive at the unlocking combination as shown in FIG. 1. Thus, a user of the device 100 may rotate any one or more of the wheels so that the symbols shown adjacent the indicators 61, 62 (such as 1234) no longer are the unlocking combination and the device 1000 is locked onto the container 1002 until the locking combination is again set.

The indicators 61, 62 that indicate the location at which the unlocking code will unlock the clam shell cap cover device 1000 may be located, as shown on FIG. 1, on the cap portion 1008 and the housing 1004, but may also be located elsewhere. Each indicator 61, 62 may be a physical element, may be a symbol indented into the material or painted. While the indicators in FIG. 1 are an arrow 61 and a dot 62, each indicator may be any type of symbol that can indicate to a user a location for the unlocking code so that each indicator may be a star, the dot, the arrow, two arrows, etc.

The container 1002 may house/store contents that may be locked or unlocked using the clam shell cap cover device 1000 to prevent unauthorized access to the contents. In one embodiment, the contents may be a medication or prescription and the container 1002 may be a medication bottle that a patient may pick up from a pharmacy. In operation, an employee of the pharmacy may select an unlock code (as described below) and provide the unlock code to the patient or the pharmacy may retrieve the clam shell cap cover device 1000 that has already has a set unlock code that is provided to the patient.

While the combination shown in FIG. 1 has 4 symbols (due to the 4 wheels), the clam shell cover cap device 1000 may have any number of wheels and thus number of combinations. Furthermore, while the symbols in FIG. 1 are numbers, the symbols on each wheel may be alphanumeric characters or any other symbols that may be used for the combination. In one embodiment, the unlock combination is not resettable by the patient or any party, but may be set at the manufacturer or at the pharmacy as described above. In one embodiment, the unlock combination is set be selecting the one or more wheels 46A-46D as described below in more detail.

Figure 2A:
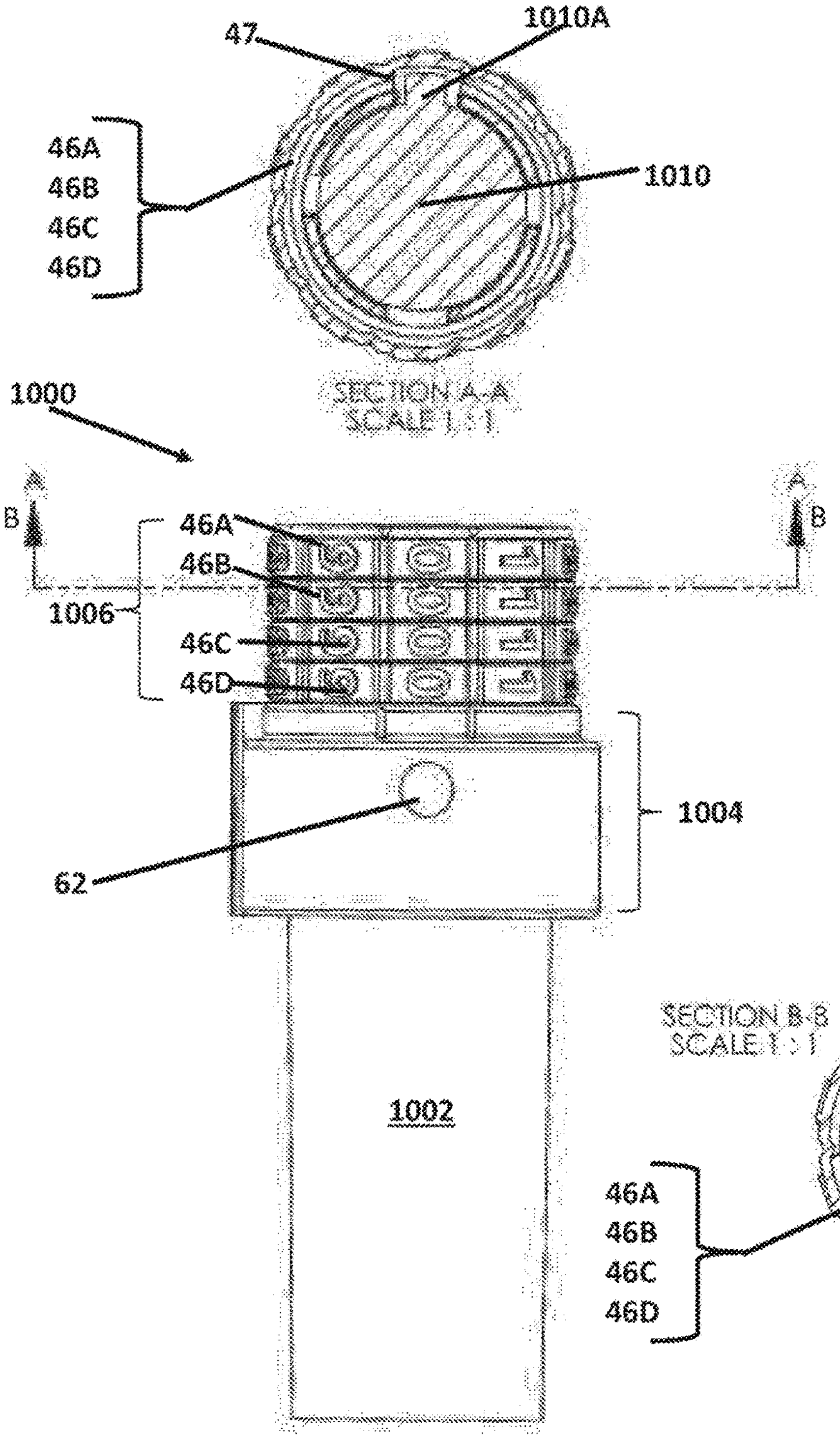
FIGS. 2A and 2B are a sectional view of the clam shell cover cap device shown in FIG. 1 in the unlocked position and a section view of the clam shell cover cap device in the locked position.
Figure 2B:
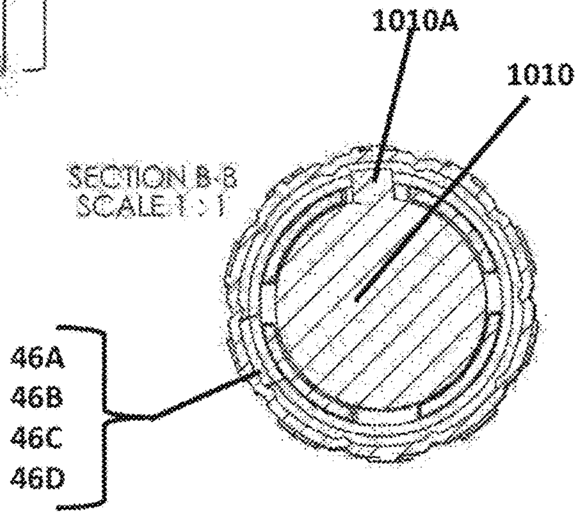

FIGS. 2A and 2B are a sectional view of the clam shell cover cap device shown in FIG. 1A in the unlocked position and a sectional view of the clam shell cover cap device in the locked position. As shown in FIG. 2A, each wheel 46A-46D is a ring that rotates about a wheel center post 1010 of the housing 1004. The wheel center post 1010 has one or more tabs 1010A wherein each tab 1010A interacts with each wheel 46A-46D. Each wheel 46A-46D has a cutout region 47 in the ring as shown. When the unlock combination code is selected (example of which is shown in FIG. 1), the tabs 1010A and the cutout regions 47 are vertically positioned adjacent and aligned with each other so that the clam shell cover cap device can be removed from the container 1002. As shown in FIG. 2B, when the clam shell cover cap device 1000 is locked which means that a symbol on at least one wheel is no longer the unlocking combination, such as the wheels showing 0001 or 1234, etc. adjacent the indicators 61,62) As a result, at least one of the tabs 1010A is not aligned with at least one of the cutout regions 47 of the wheel so that the clam shell cover cap device 1000 cannot be removed from the container 1002.

Figure 4:
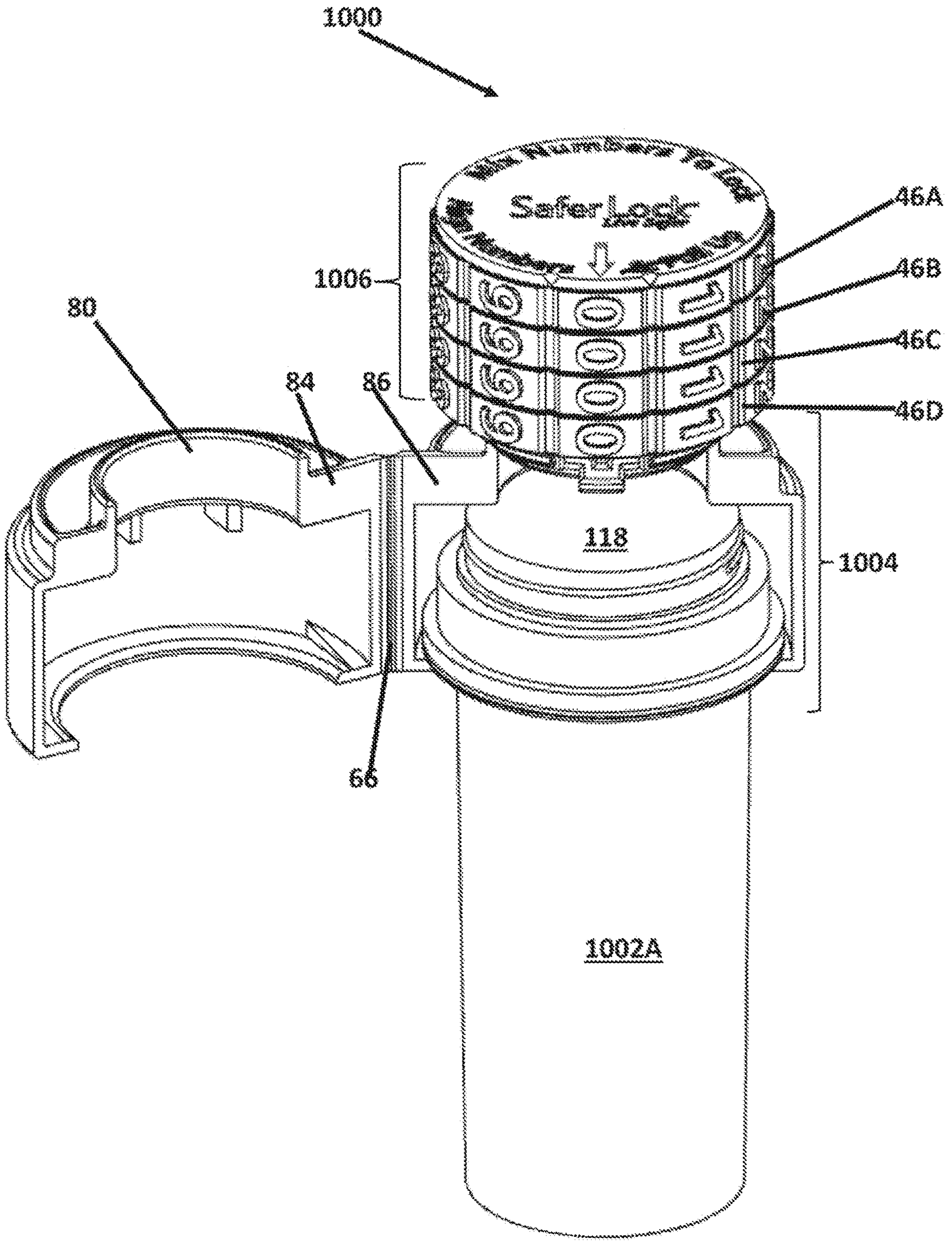
FIG. 4 is a view of the clam shell cover cap device in the open/up position with the medication bottle exposed, set in the device housing.

FIG. 3 is a view of the clam shell cover cap device 1000 in the closed/up position with the correct combination set. When the unlock code is selected as shown in FIG. 3, the housing 1004 and the wheel assembly (shown in FIGS. 2A and 2B) may be pulled upward since the tabs 1010A and cutout regions 47 are aligned. In the upward position, the area of the housing 1004 at position 70 is exposed. The housing 1004 has a living hinge 66 on the housing which splits the housing into two sides as shown in FIG. 4 once the housing 1004 is opened. In the upward position, there is a gap and the housing has a ridge portion 80 that is free so that the living hinge 66 can be opened. The ridge at position 70 on FIG. 3, when closed/down, prevents the hinge from being opened.

Figure 5:
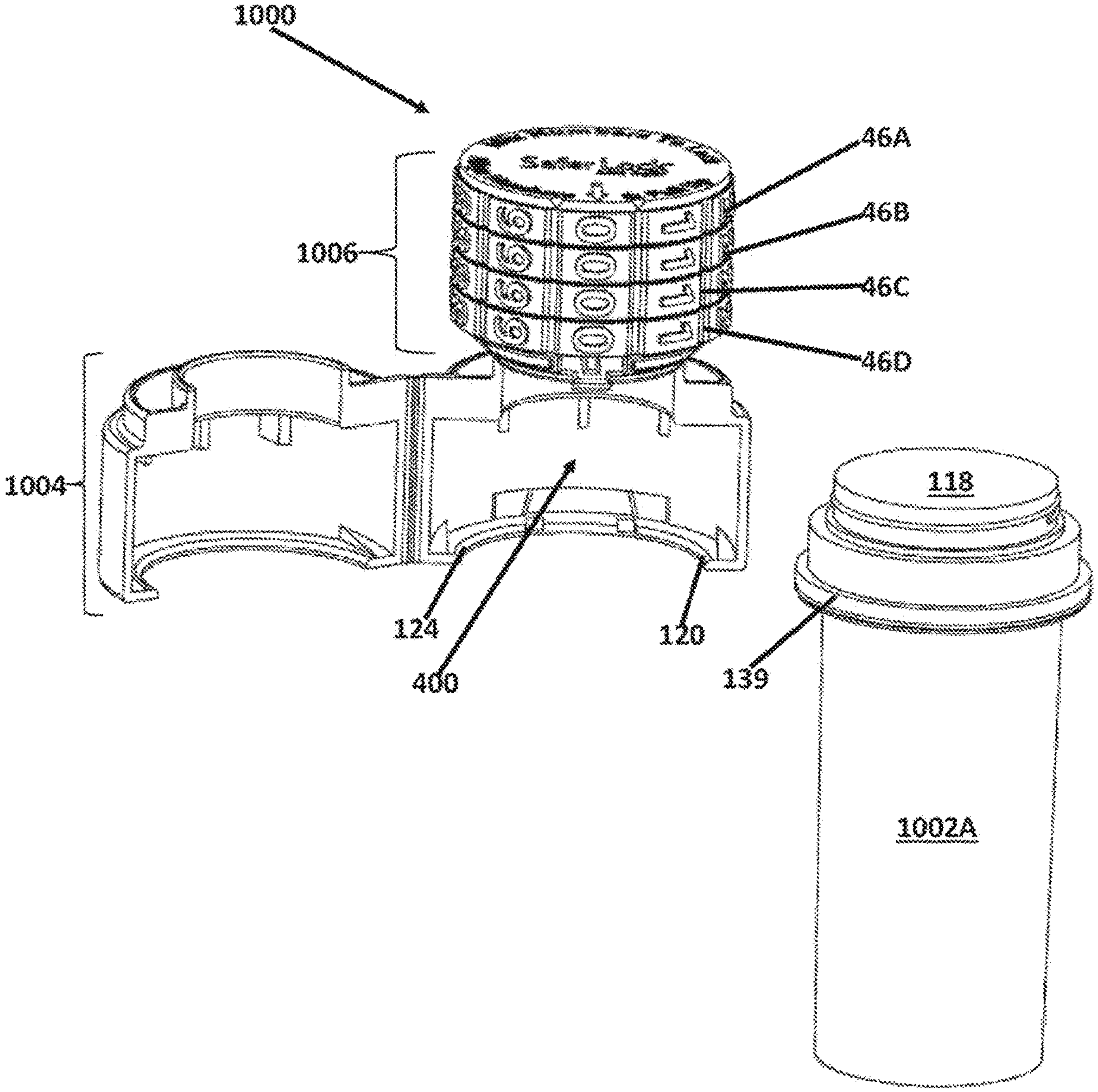
FIG. 5 is a view of the clam shell cover cap device in the open/up position with the medication bottle removed from the device housing.

FIG. 4 is a view of the clam shell cover cap device 1000 in the open/up position with the medication bottle exposed, set in the device housing 1004 with the wheel carriage 1006 and number wheels 46A-46D are in the up position exposing an existing medication bottle 1002A that has an existing medication closure/cap 118 and FIG. 5 shows the medication bottle 1002A and its cap 118 being removed from the clam shell cover cap device 1000. In the up position, also note that the lowest tab 1008A is exposed. When in the open position, a first side of the housing 84 separates from a second side of the housing 86 at the hinge 66 in a clam shell fashion. In one embodiment, the clam shell cover cap device 1000 is a modular design wherein the housing carriage 1006, the housing 1004 and the wheels 46A-46D do not come apart from the housing after assembly. When open the existing medication bottle 120 and existing medication bottle closure 118 can be removed from the modular device shown in FIG. 5. The internal structure of the housing 1004 may have internal structures that may be adjusted to accommodate different containers and bottles.

As shown in FIG. 4, the existing medication bottle 1002A and existing closure 118 fit inside the housing 1004 in a cavity 400 within the housing 1004 formed when the two pieces of the housing are closed. There are different shapes and sizes of the cavity 400 to accommodate different bottles/containers and different closures and closure sizes. The bottle/container closure 118 may have a lip 139 that permits the clam shell cover cap device 1000 to securely lock to the medication bottle or vial. A lip retention ring 124, 120 in the housing 1004 and the inside shape of the cavity 400 can be made to fit different bottles and vials shown in FIG. 6.

Figure 6:
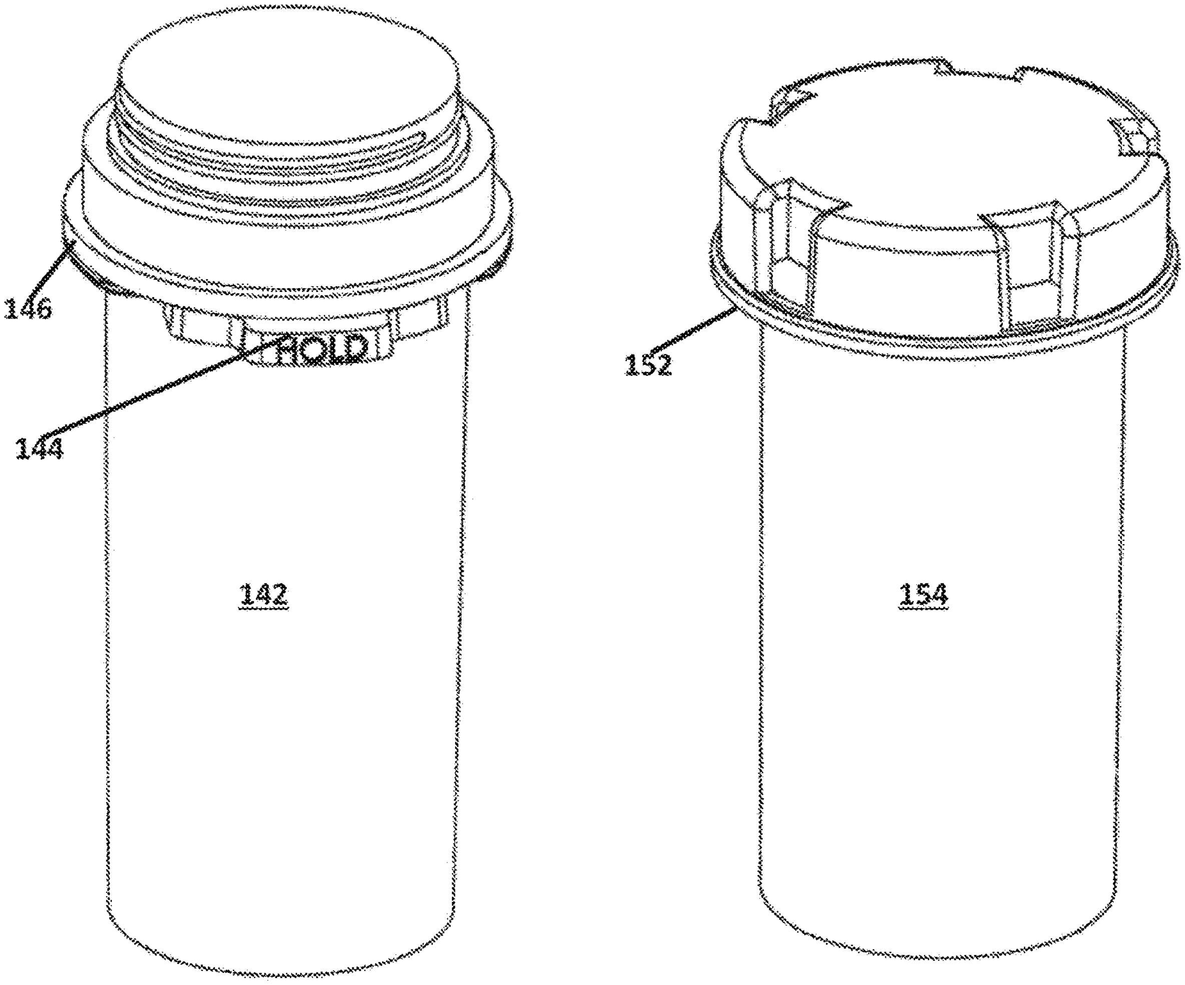
FIG. 6 shows existing medication bottles with different style closures that may fit into the clam shell cover cap device.

FIG. 6 shows examples of two existing medication bottles 142, 154 with different style closures, both of which may fit into the clam shell cover cap device 1000. Each bottle 142, 154 has a lip 146 and 152 in order to be secured in the device. Some odd shapes 144 can be adjusted for within the housing 1000 design and the cavity 400 design. Thus, various different cavity 400 shapes and sizes may be manufactured for different sized or shaped bottles and caps. As described above, the clam shell cover cap device 1000 may be used for other containers or for a medication bottle without a cap and then the size and shape of the cavity 400 may be adjusted as needed.

Figure 7:
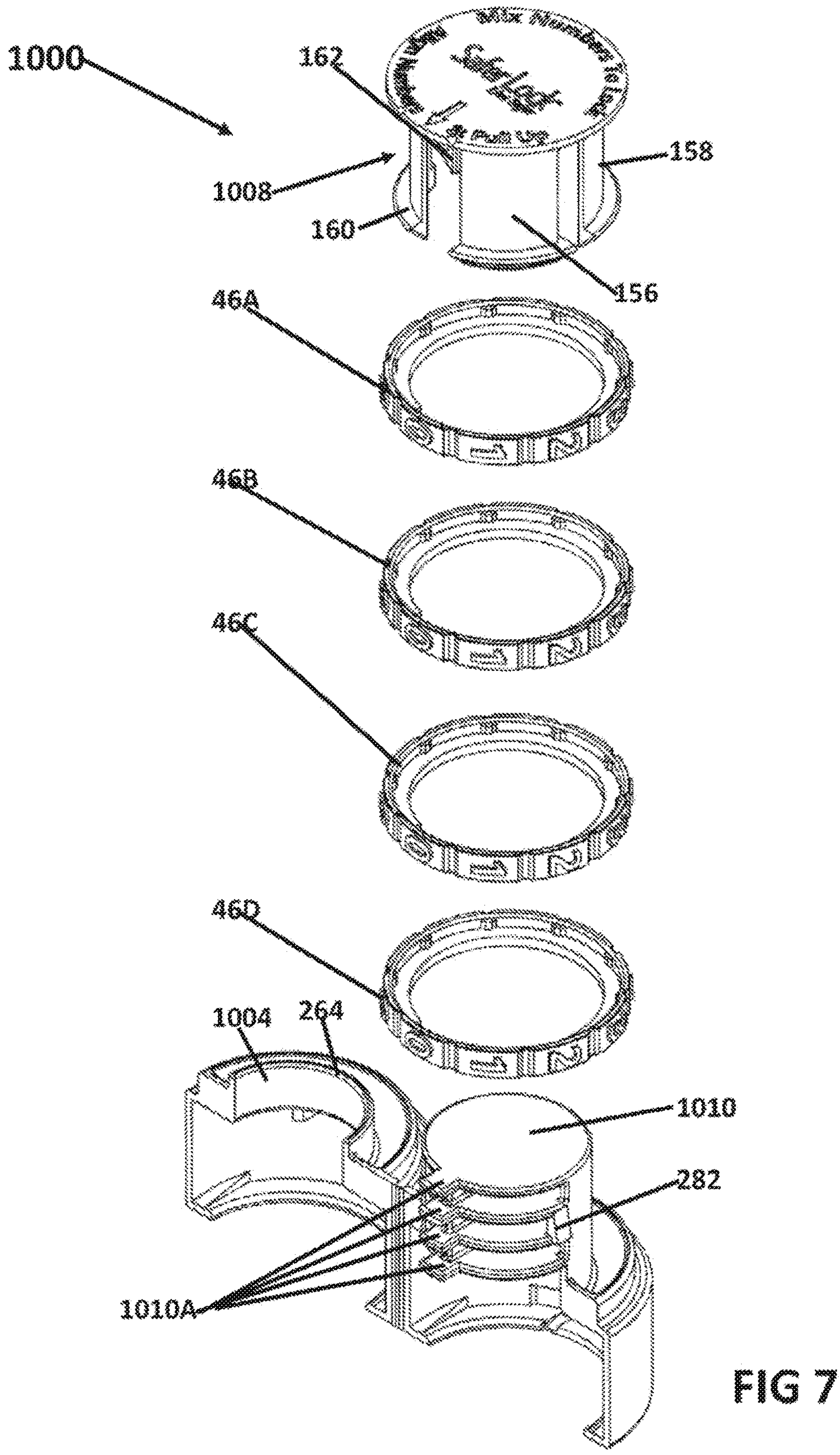
FIG. 7 is an exploded assembly diagram of the clam shell cover cap device.
Figure 8A:
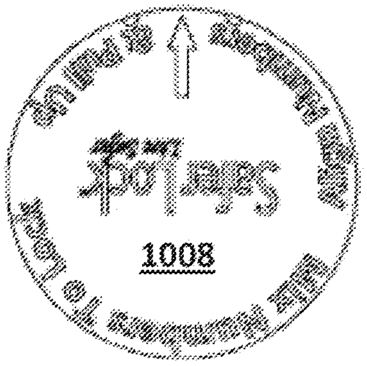
FIGS. 8A-8F are views illustrating the wheel carriage of the clam shell cover cap device.
Figure 8B:
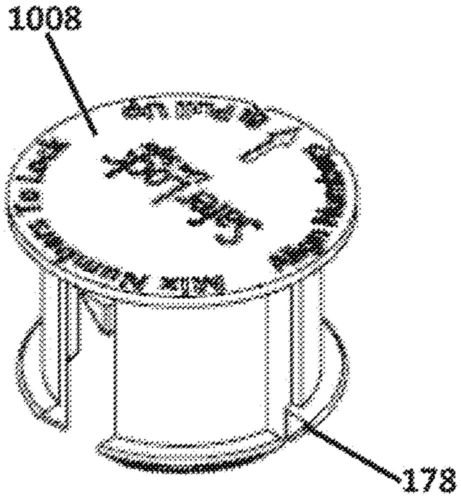
Figure 8C:
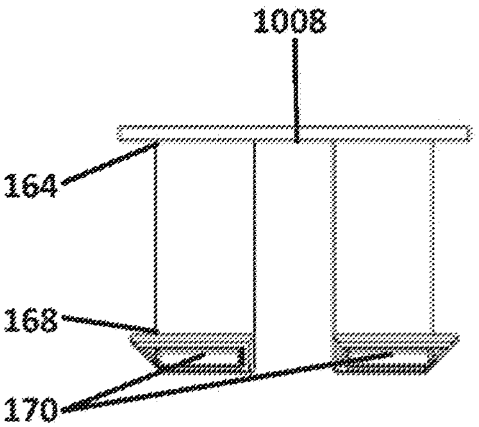
Figure 8D:
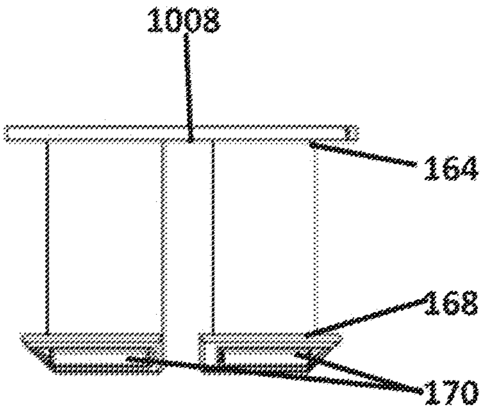
Figure 8E:
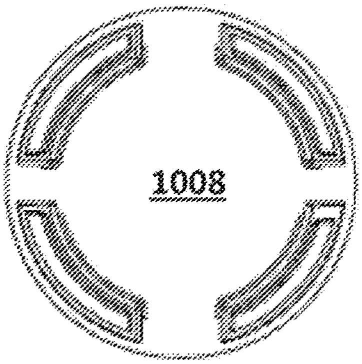
Figure 8F:
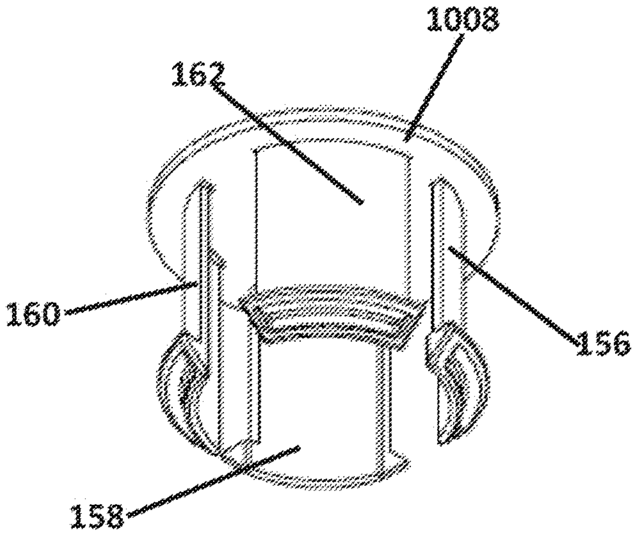
Figure 9C:
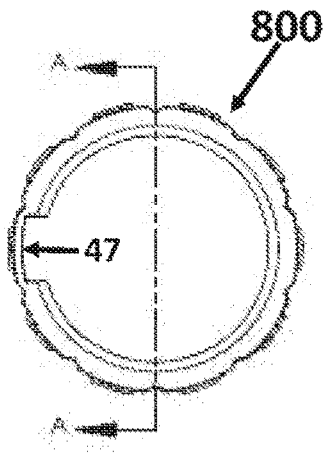
FIGS. 9A-9D are views illustrating the non-resettable number wheel, shown with the example number zero.
Figure 9D:
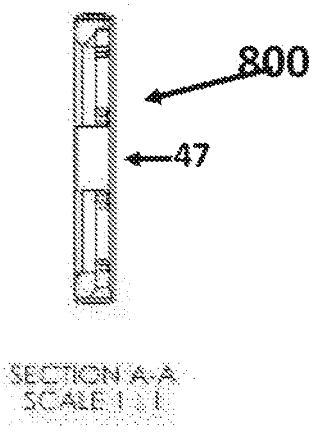
Figure 9B:
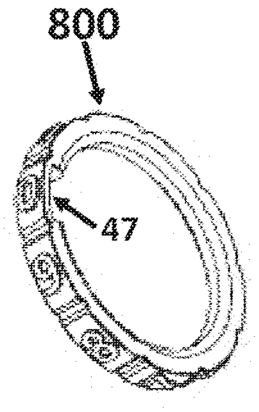
Figure 9A:
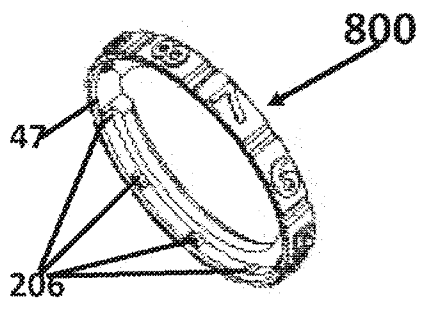

FIG. 7 is an exploded assembly diagram of the clam shell cover cap device 1000 with the one or more wheels 46A-46D, the cap portion 1008 and the housing 1004 that has the wheel center post 1010 with the tabs 1010A for each wheel. The cap portion 1008 may including the top portion and one or more wheel carriage arms 156-162 and together form a wheel carriage assembly. To assemble the clam shell cover cap device 1000, the one or more wheel carriage arms 156, 158, 160, 162 may be squeezed inwards (since each arm is made of a material like plastic that flexes) so there is a smaller diameter than the inside of each number wheel. Before each wheel is slid onto the arms 156-162, a manufacturer or an authorized user like a pharmacist or pharmacy employee may choose an unlock combination by choosing the wheels whose symbols are the unlock code. For example, an authorized user may select "0000" as the unlock code by selecting four "0" wheels in which the cutout region is adjacent the "0" symbol on the wheel so that the clam shell cover cap device 1000 opens when "0000" are lined up with the indicators since the tabs 1010A and the cutout regions of the wheels are all aligned.

Once the one-time unlock code is selected and the appropriate wheels selected, the one or more wheels slide over and onto the wheel carriage arms 156-162 and are held on the arms by a ledge region 170 at a bottom of each arm. Note that the order in which the wheels are slid onto the arms 156-162 is important since the order sets the unlock code. For example, if the wheels are "1", "2", "3" and "4", the order of the wheels can set the unlock code to 1234, 4321, 2341, etc.

Next the wheel carriage arms 156-162 are slid onto the housing 1004, past a one way catch 282 and into position surrounding the wheel center post 1010. The one way catch 282 prevents the wheel carriage arms 156-162 and cap 1008 from slipping off of the housing 1004. The wheel carriage arms 156-162 has some up and down freedom when unlocked to secure a top catch 264 on the small side of the housing. When in use, a bottle 1002 can be placed inside the cavity 400 of the bell housing, two piece housing is closed in a clam shell manner. The wheels 46A-46D and the cap portion 1008 may then be moved downward to close the clam shell cover cap device 1000. The user may then rotate the wheels so that the unlock combination is no longer aligned with the indicators that locks the clam shell cover cap device 1000 onto the container 1002 keeping the contents of the container, such as medications, safe and secure. To open the clam shell cover cap device 1000, the user rotates the wheels until the unlock code is aligned with the indicators 61, 62 so that the cap portion 1008 can be move vertically upwards away from the container so that the contained can be removed from the clam shell cover cap device 1000.

FIGS. 8A-8F are views illustrating the wheel carriage of the clam shell cover cap device with the cap portion 108 and the wheel carriage arms 156-162. The wheel carriage holds the wheels between points 168 and 164 of the four carriage arms 156, 158, 160, 162. The carriage arms 156-162 are flexible and when assembled they bend inward towards the center thus decreasing the diameter and allows for the one or more preset wheel 46A-46D to slide over. From the back/side view 166, the carriage arms 202 and 204 along with the other two arms are pushed together to assemble the number wheels onto the wheel carriage. At a free end of each arm 156-162 opposite cap portion, each arm has a retaining feature 170 that retains the wheels 46A-46D on the wheel carriage.

FIGS. 9A-9D are views illustrating the non-resettable number wheel 800, shown with the example number zero. The cut-out region/notch 47 may be adjacent the "0" symbol on the wheel since "0" represents the unlocked position of the exemplary number wheel shown in FIGS. 9A-9D. If the wheel's unlock symbol was "2", then the cutout region/notch 47 would be adjacent to the "2" symbol. Each wheel may further comprise a number, such as ten, of security nubs 206. If pressure is forced in the wrong direction, these nubs 206 will bind on the housing tabs 1010A and the wheels will have trouble spinning around the housing. In different embodiments, each symbol on a wheel may be molded sticking out from the surface of the wheel as shown in FIGS. 9A-9D, but can also be molded inward or printed onto a flat surface of a wheel.

Figure 10:
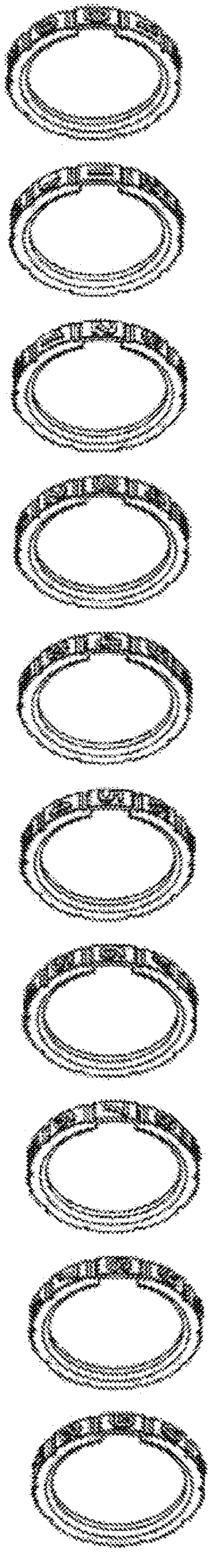
FIG. 10 shows each non-resettable number wheel 0-9.
Figure 11A:
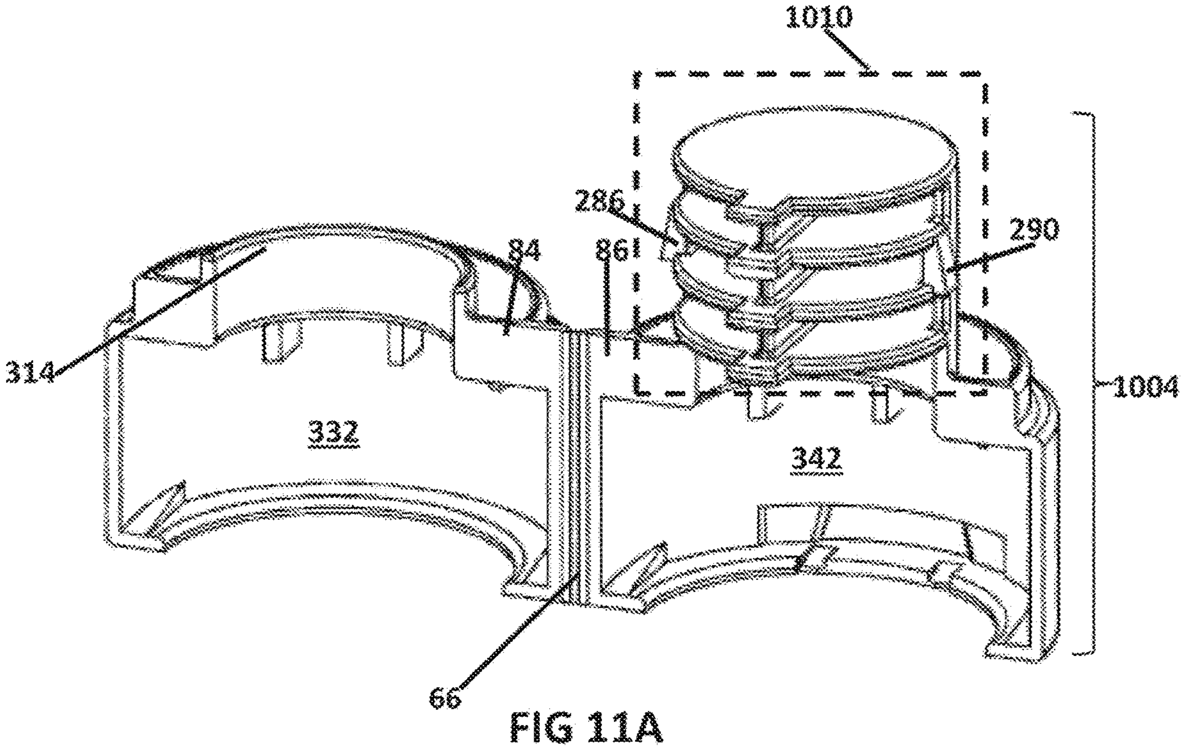
FIGS. 11A-11D are view of the clam shell cover cap device housing.
Figure 11B:
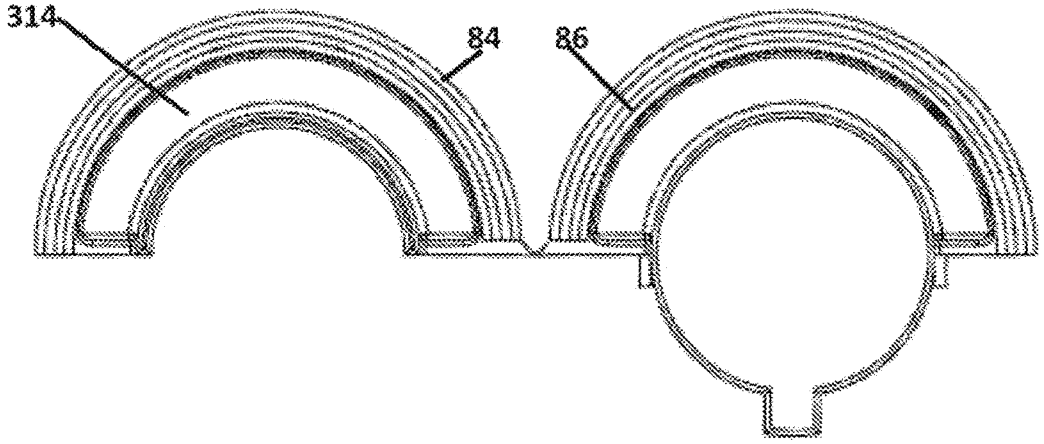
Figure 11C:
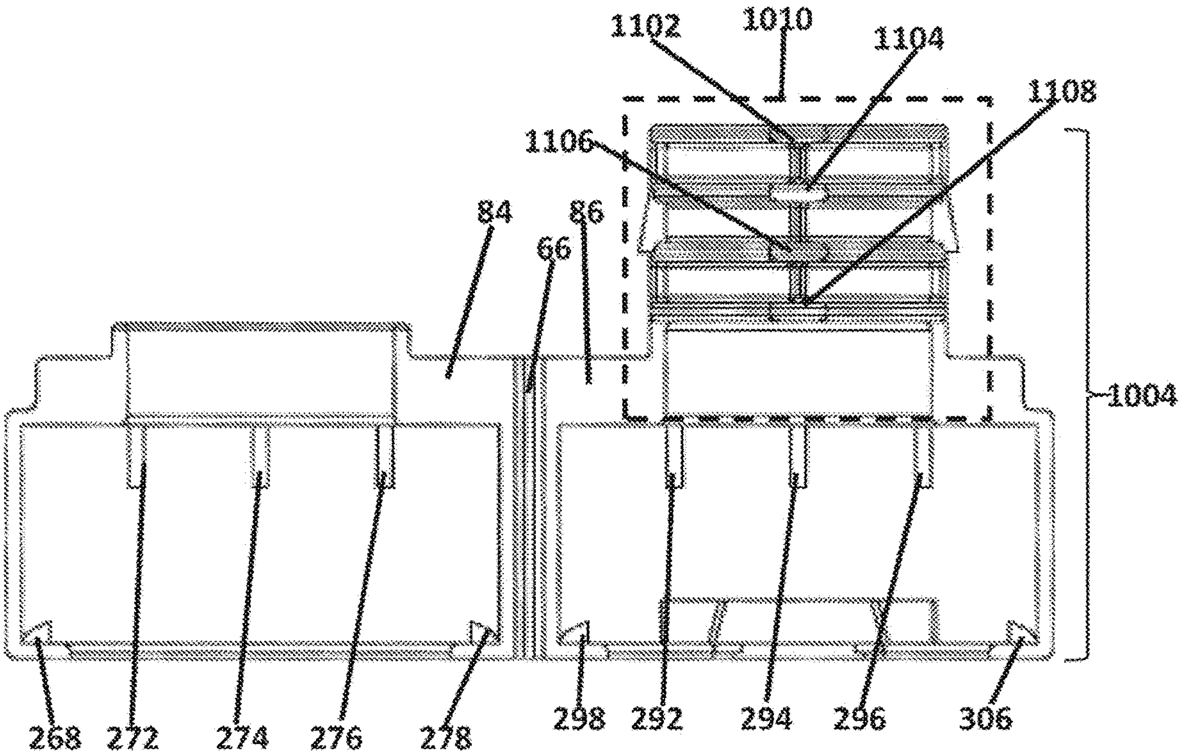
Figure 11D:
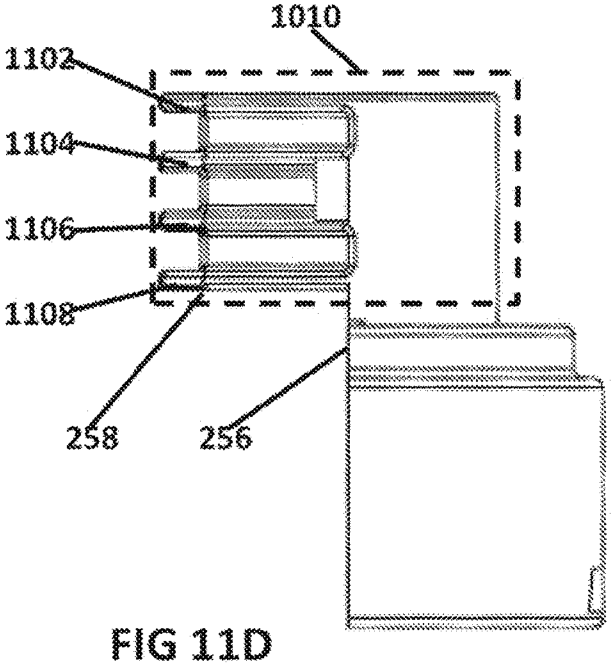

FIG. 10 shows each non-resettable wheel that may be provided to an authorized user who sets the unlock code for the clam shell cover cap device 1000. In one example, the symbols used are "0" to "9" and the combinations, including the unlock combination, are number combinations. If other symbols are being used for the clam shell cover cap device 1000, then the wheels will look differently since the symbols on the outside of the wheel will be different. In FIG. 10, each wheel shown has its own unlocking symbol, "0" to "9" as can be seen by the cutout region adjacent each unlocking symbol. When each of the wheels is being manufactured by molding, each wheel is molded separately. During initial manufacturing assembly a number tag indicator sticker 18 and 8 of FIG. 1, this is used to determine the assembly of the combination may be provided when the non-resettable unlock code is set by the manufacturer. Thus, for each unlock code, such as 0000, 1012, 0102 shown in FIG. 1 or 1234, 9876, etc., the manufacturer or the authorized user selects the wheels for the selected unlock code.

FIGS. 11A-11D are view of the clam shell cover cap device housing 1004 with the center post 1010 and the living hinge 66 between the two pieces 84, 86 of the two piece housing. As described above, the center post may have one or more tabs/locking teeth that keep the clam shell cover cap device 1000 locked until the unlock code is aligned with the indicators. In the example in which a four symbol unlock code is being the, center post 1010 may have a first tab/locking tooth 1102, a second tab/locking tooth 1104, a third tab/locking tooth 1106 and a fourth tab/locking tooth 1108 that are fixed by the center post 1010 to be in vertical alignment with each wheel when the one or more wheels are installed to set the unlock code. In one embodiment, the center post 1010 may have two rows of four locking teeth for added security. A top round portion 314 of the smaller side 84 fits into the lower cavity of the larger side 86 into the position seen at 258 and 256.

When closed together the top portion 314 of the smaller side 84 is the bottom of the cylinder that the wheel carriage 1008 slides over when the device is assembled. When the wheel carriage 1008 slides into the downward position, the smaller side 84 of the housing 1004 cannot be opened and this locks the device 1000 onto the top of an existing medication bottle and closure 1002. When at least one wheel is rotated from the unlocked position to a locked position, the housing teeth 1102-1108 hold the wheel carriage 1008 and wheels 46A-46D in place.

With the unlock code combination aligned with the indicators 61, 62, the wheel carriage 1008 with the wheels 46A-46D can move up, freeing the smaller side 84 of the housing 1004 to hinge open which releases the existing medication bottle 1002 from the device 1000. The device 1000 is modular once assembled and there are two one way catches 286 and 290 on the housing 10004 (see FIG. 11A) which fit into the wheel carriage 1008. Two of the carriage arms of the wheel carriage 1008 may include a cut-out 178 which slides past the one way catches 286 and 290 locking the carriage 1008 onto the housing 1004 and making the device 1000 modular once assembled. More specifically, once past the one way catch feature 286, 290 during assembly, the wheel carriage 1008 will not come off the housing 1004 through normal use.

The shape and size of the housing cavity/bell 332 and 342 can be adjusted based on the type of container 1002 being secured. For example, the existing bottle 142 (FIG. 6) has an extrusion which is not round and this feature is compensated for in the bell housing. If the existing bottle was simply round, the round surface of the bell part of the housing would be reflected onto the larger side of the housing 1004. There are structures 272, 274, 276, 278, 268, 306, 298 292, 294, 296 built into the bell housing to fit specific bottles/containers 1002 and these are support structures to hold containers, such as existing medication bottles, in place correctly.

SECOND EMBODIMENT

A second embodiment of the clam shell cover cap device is now described. The second embodiment operates with the same principles as the above described embodiment and like reference numbers refer to like elements in this second embodiment. In this second embodiment, each of the plurality of wheels 46A-46D may click into each position making it easier for a user to select the unlock code, for example. In addition, each wheel has a feature that allows all of the wheels to stack together which make the assembly of the clam shell cover cap device easier. In addition, the second embodiment may have a slightly different indicator 261 (shown best in FIGS. 16B and 17) and the unlock code location is 180 degrees from the living hinge and aligned with the location at which the two portions of the clam shell cover cap device come together to close the clam shell cover cap device (see FIGS. 16B and 17) whereas the unlock location was 90 degrees offset from the hinge as shown in FIGS. 1 and 4. The location of the unlock code in this second embodiment has been found to be easier for a user. Furthermore, a skirt adjacent the unlock code (see FIGS. 15 and 16A-16B) has been reinforced to prevent bending of the clam shell cover cap device which prevents a user from prying the bottle out of the clam shell cover cap device. More details of the second embodiment of the clam shell cover cap device will now be described with reference to FIGS. 12-18C.

Figure 12:
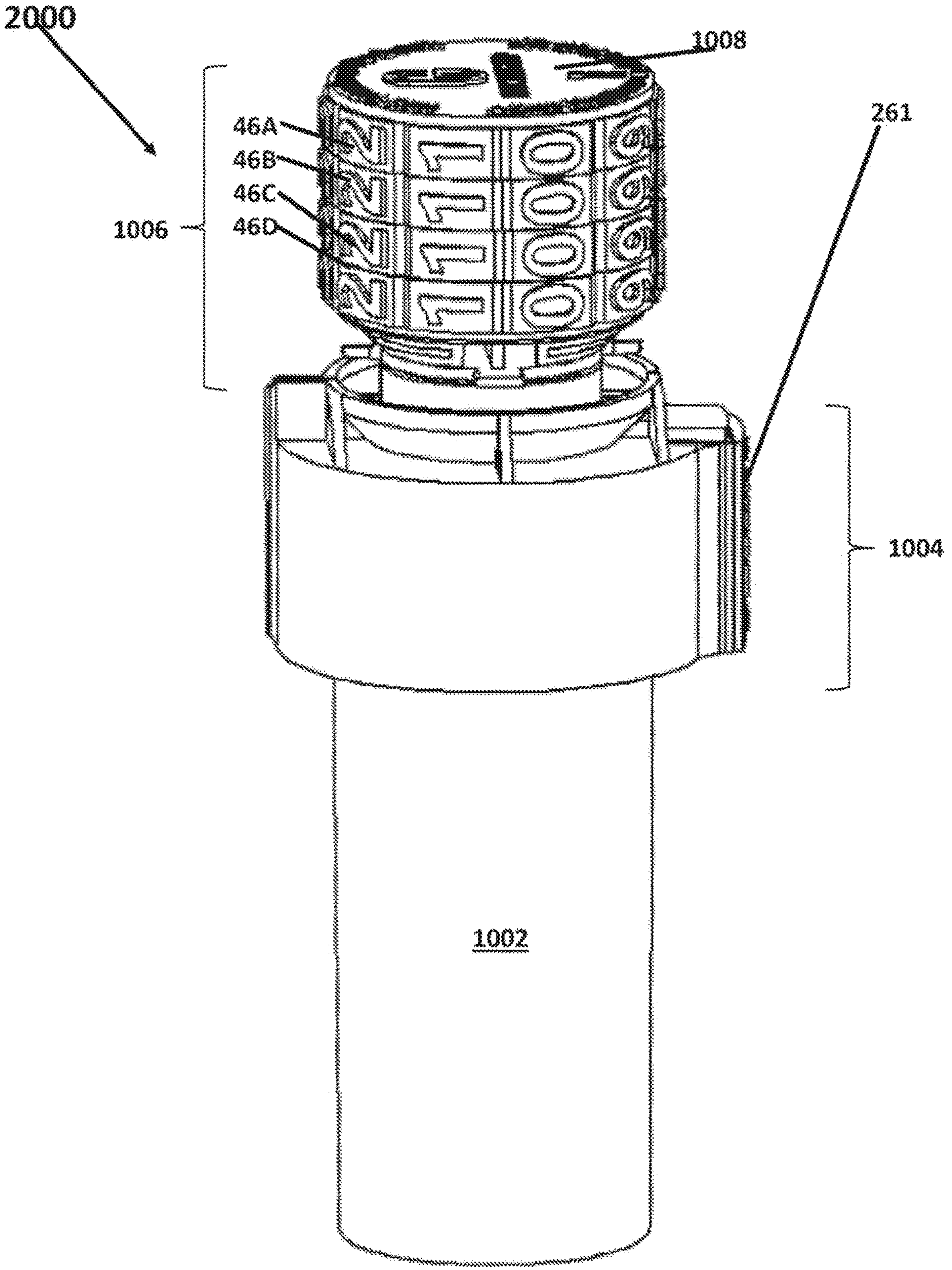
FIG. 12 illustrates a second embodiment of the clam shell cover cap device in the closed/down position with the correct combination set.
Figure 13:
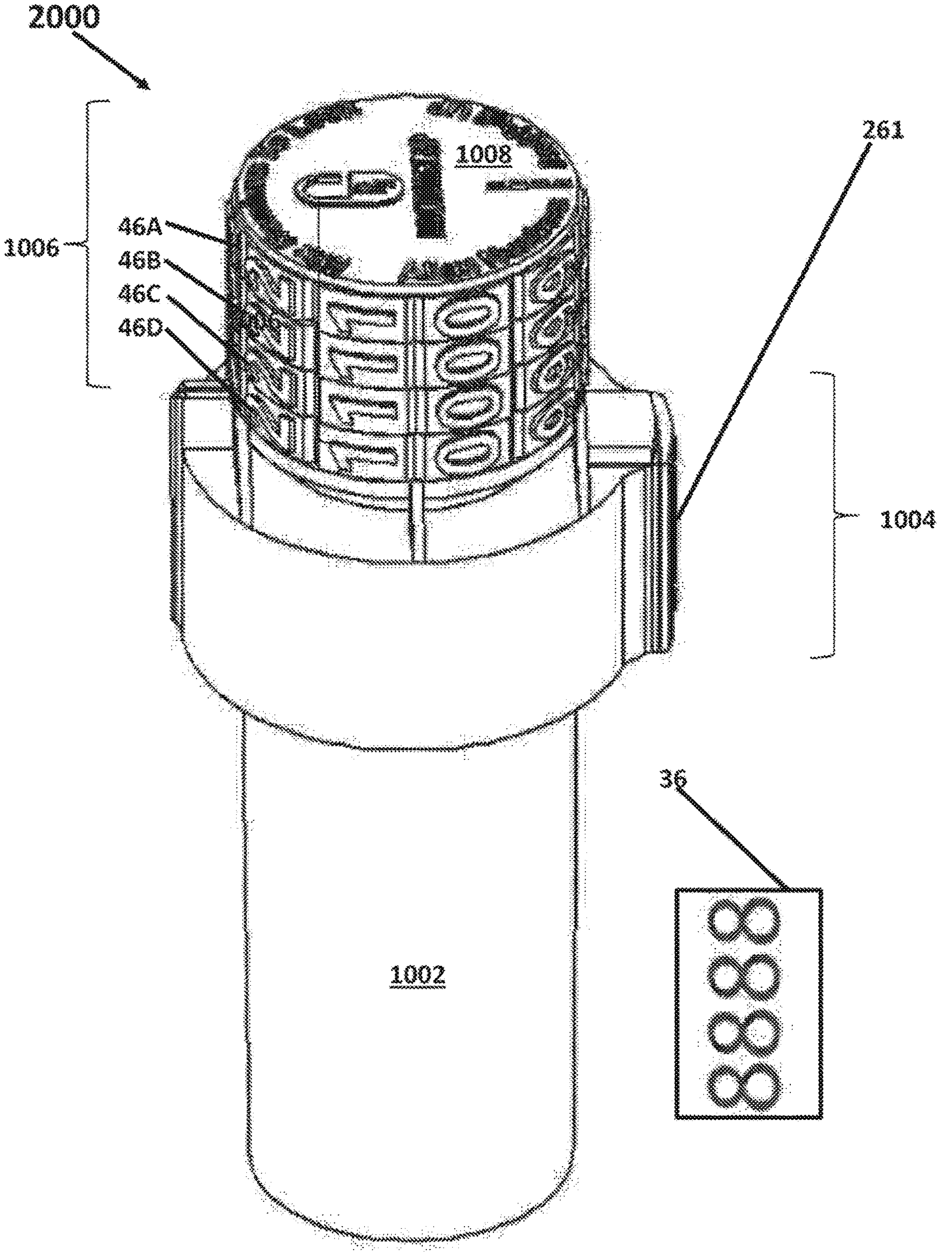
FIG. 13 is a perspective view of the second embodiment of the clam shell cover cap device in the closed position with the correct combination set.
Figure 14:
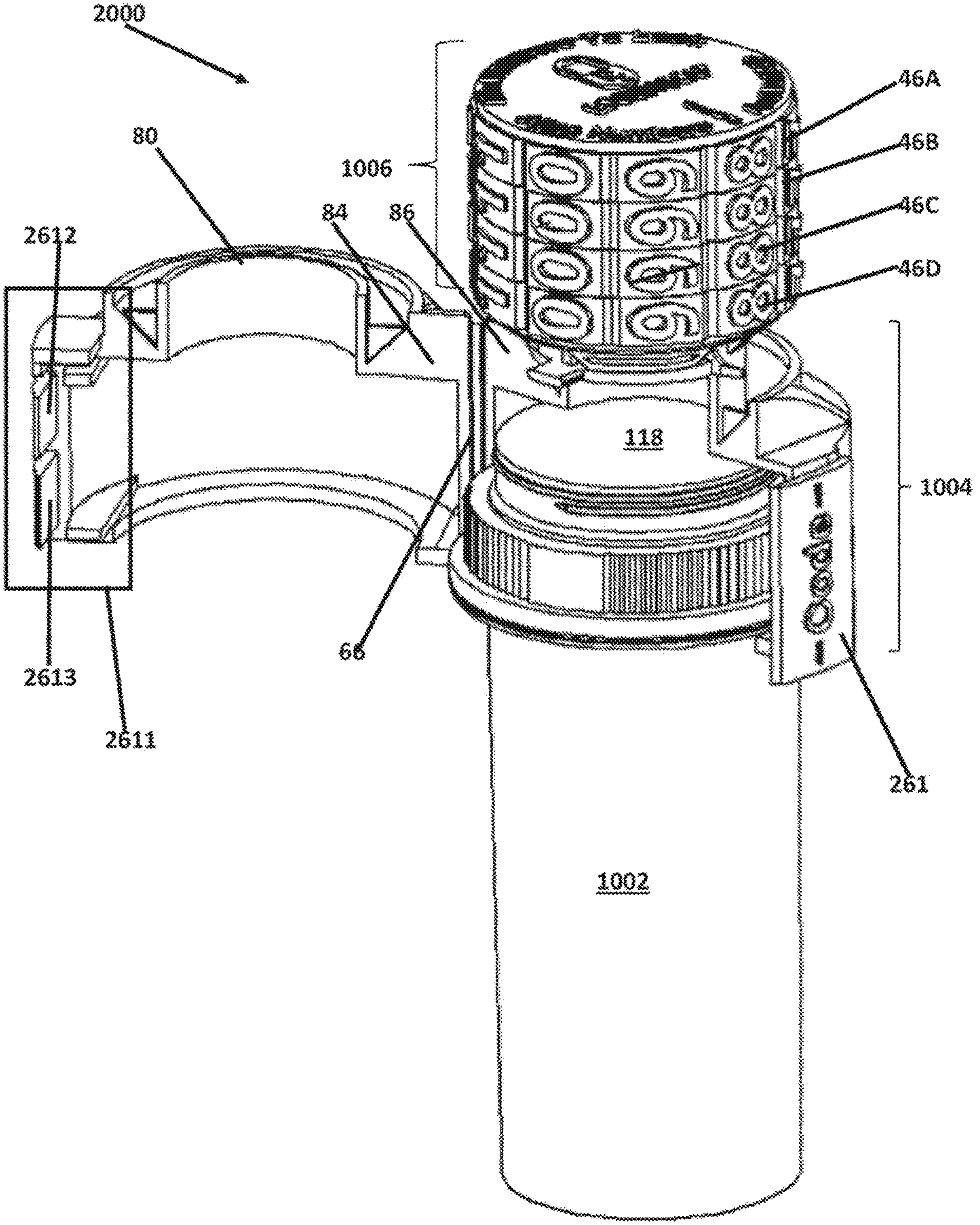
FIG. 14 illustrates the second embodiment of the clam shell cover cap device in the open/unlocked position.

FIGS. 12 and 13 illustrate a second embodiment of the clam shell cover cap device 2000 in the closed/down position with the correct combination set (8888 in the example in FIGS. 12-13) and FIG. 14 shows the second embodiment of the clam shall cover cap device 2000 in the open/up position. In this embodiment, an indicator 261 may be formed in the device 2000 in an unlock position and the symbols of the one or more wheels 46A-46D may be aligned with the indicator 261. Thus, the device 2000 is open, but the device is in a down position covering the top of the container 1002 as shown in FIGS. 12-13 as compared to the up position in FIG. 14.

The clam shell cover cap device 2000 may further comprise the housing portion 1004 that fit over and around the top of the container and the locking portion 1006 connected to the housing portion 1004 and the cap portion 1008 that are made of the same material as described above and function in the same way as described above that are not described for this embodiment. As with the first embodiment, this embodiment has one or more wheels 46*a*-46*d*, four being shown in the example in the Figures, that rotate between an unlocking combination as shown in FIGS. 12-13 and a plurality of locking combinations (being all of the other possible combinations of the symbols of the one or more wheels except for the unlocking combination). Each wheel may have one or more symbols (with numbers in the example shown) and the symbols on each wheel may be rotated around to arrive at the unlocking combination as shown in FIGS. 12-13. Thus, a user of the device 100 may rotate any one or more of the wheels so that the symbols shown adjacent the indicator 261 no longer are the unlocking combination and the device 2000 is locked onto the container 1002 until the unlocking combination is again set.

In this embodiment, the indicator 261 (shown in FIG. 17) may say "Code" and indicate the location at which the unlocking code will unlock the clam shell cap cover device 2000 and may be located on the housing 1004 as shown in FIGS. 12-13, but may also be located elsewhere. The indicator 261 may be a symbol indented or embossed into the material or painted. As described above, the indicator 261 is this embodiment may be 180 degrees from the living hinge and aligned with the location at which the two portions of the clam shell cover cap device come together to close the clam shell cover cap device (see FIGS. 14, 16B and 17). As shown in FIG. 14, the housing 1004, in this embodiment, that may further include a thickened first portion 2611 that has one or more tongue regions 2612, 2613 (with two shown in the example in FIG. 14). In the example shown on FIG. 14, the two tongue regions 2612, 2613 may be vertically aligned and vertically stacked on each other (although the one or more tongues and one or more cavities may be horizontally aligned). The one or more tongue regions 2612, 2613 and the thickened portion 2611 reinforces this portion of the housing 1004. The indicator element 261 (shown best in FIG. 16A) may be thickened (and is a second portion) and may have one or more cavities 2614, 2615 into which the one or more tongue regions 2612, 2613 fit when the device 2000 is closed (by bringing the first portion and the second portion together) as shown in FIG. 17. The thickened regions and the tongues 2612, 2613 and cavities 2614, 2615 reinforce the housing 1004 at the location at which the two portion of the housing close to prevent bending of the device 2000 and prying, by the user, the bottle 1002 out of the device 2000. The features 2612-2615 adjacent the indicator 261 (collectively known as a binding feature) mate together and interlock when the device 2000 is closed so that, if someone attempts to pry the device 2000 it open, the features 2612-2615 bind together and the clamshell device 2000 cannot open.

While the combination shown in FIGS. 12 and 13 has 4 symbols (due to the 4 wheels), the clam shell cover cap device 2000 may have any number of wheels and thus number of combinations. Furthermore, each wheel may have any number of symbols (10 are shown in the example) and thus again any number of combinations. In addition, while the symbols in FIGS. 12-13 are numbers, the symbols on each wheel may be alphanumeric characters or any other symbols that may be used for the combination. In one embodiment, the unlock combination is not resettable by the patient or any party, but may be set at the manufacturer or at the pharmacy as described above. In one embodiment, the unlock combination is set be selecting the one or more wheels 46A-46D as described above.

Figure 18A:
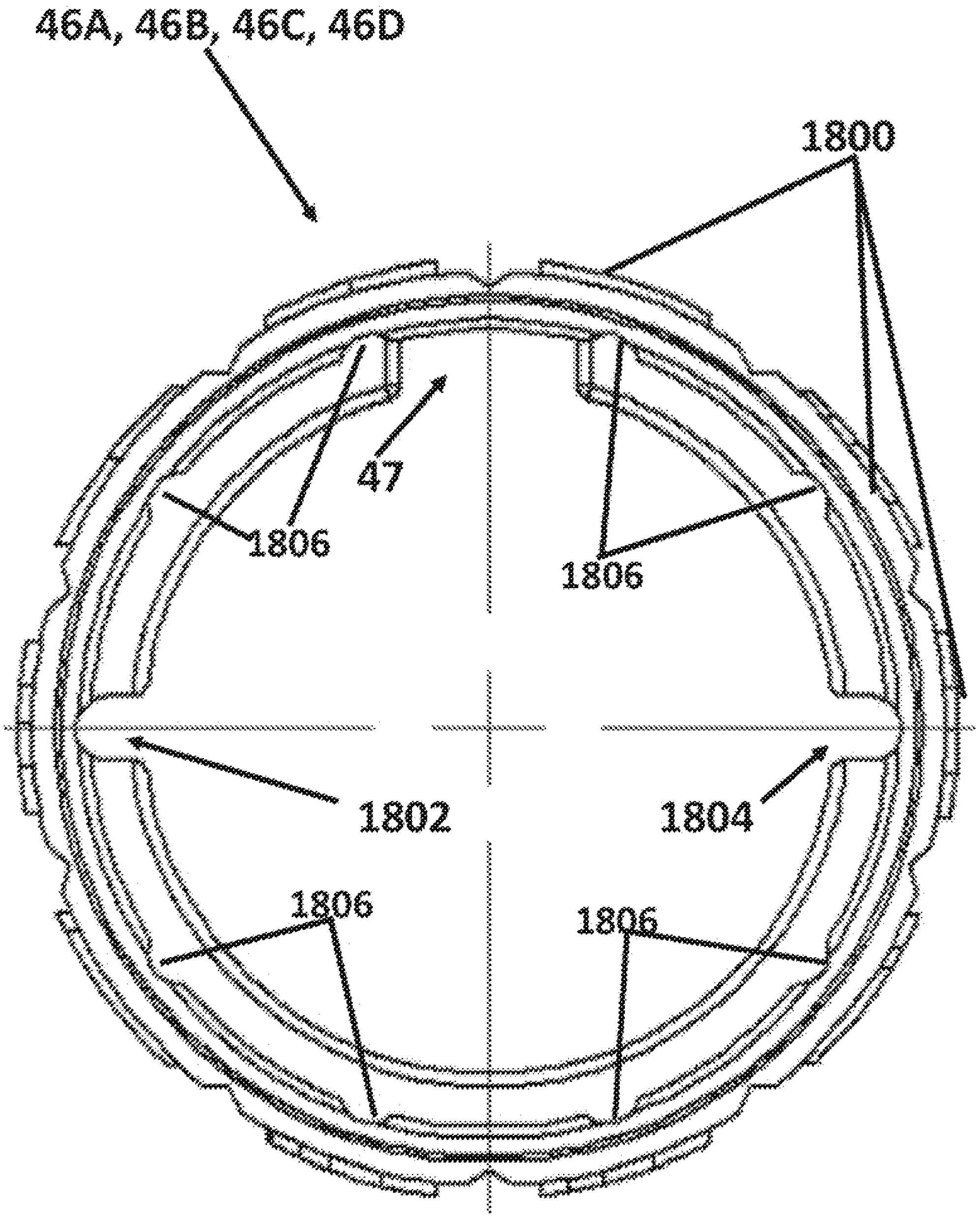
FIGS. 18A-18C illustrate each wheel of the plurality of wheels of the second embodiment of the clam shell cover cap device.
Figure 18B:
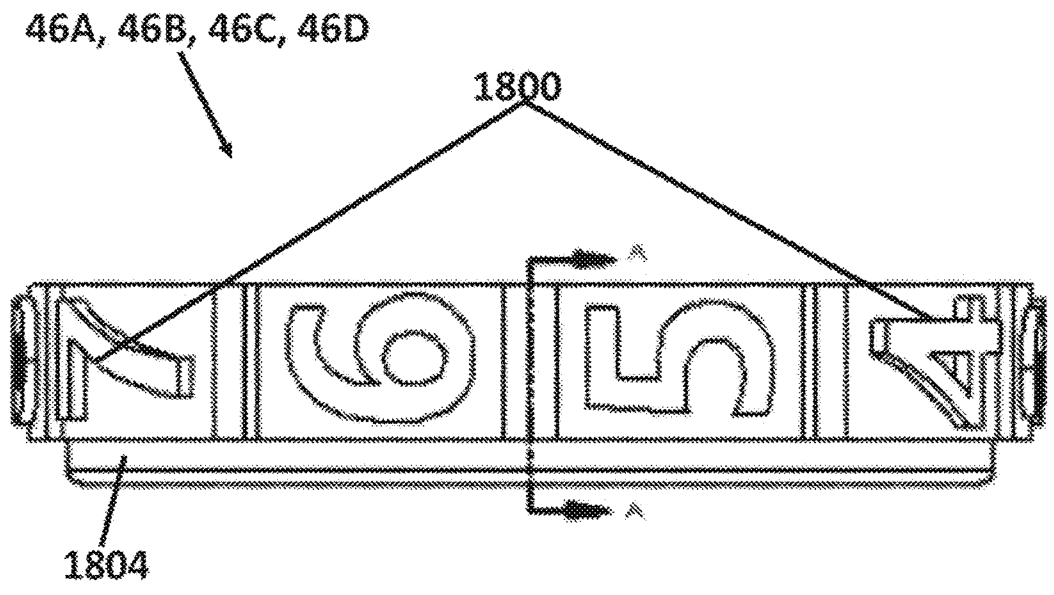
Figure 18C:
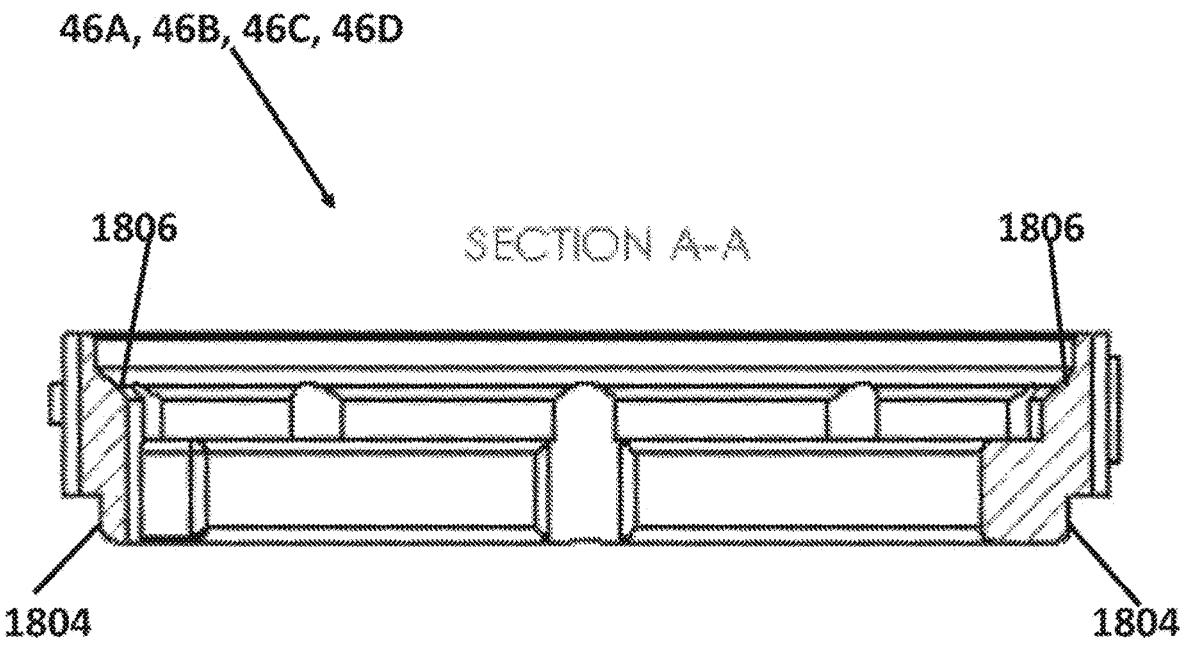

Further details of the one or more wheels 46A-46D for this embodiment are shown in FIGS. 18A-18C. Like the wheels of the first embodiment, each wheel 46A-46D of the second embodiment has one or more symbols 1800 on the outside surface of the wheel (that may be raised or cut into the outer surface of the wheel) and the cutout region 47 as described above that operates in the same manner as described above. Each wheel in this embodiment may also have the same nubs 206 (not shown in FIGS. 18A-18C for clarity) as described above that operates in the same manner as described above. Each wheel 46A-46D further has one or more slots 1800, 1802 (two are shown, for example, in FIG. 18A) that cause each wheel to click as it is being turned as described below in more detail. As a result, each wheel with a symbol clicks into each symbol position at the unlock location so that when a particular symbol of a wheel is part of the unlock code, it is held in the unlock position (with the cutout region 47 appropriately positioned and held in that position) and when a particular symbol is not part of the unlock code, the device 2000 cannot be opened since the cutout region 47 is precisely not aligned with the tabs of the housing as described above.

As shown in FIGS. 18B and 18C, each wheel 46A-46D has a rim portion 1804 around the periphery of a bottom surface of each wheel and a cutout portion 1806 around the periphery of a top surface of each wheel. When two or more of the wheels are assembled, the rim portion 1804 of one wheel seats in the cutout portion 1806 of the wheel beneath the first wheel in the stacked formation as shown in FIGS. 12-13. The stacking of the wheels allows the device 2000 to be more easily assembled since each wheel cannot slide relative to each other during the assembly.

Figure 15:
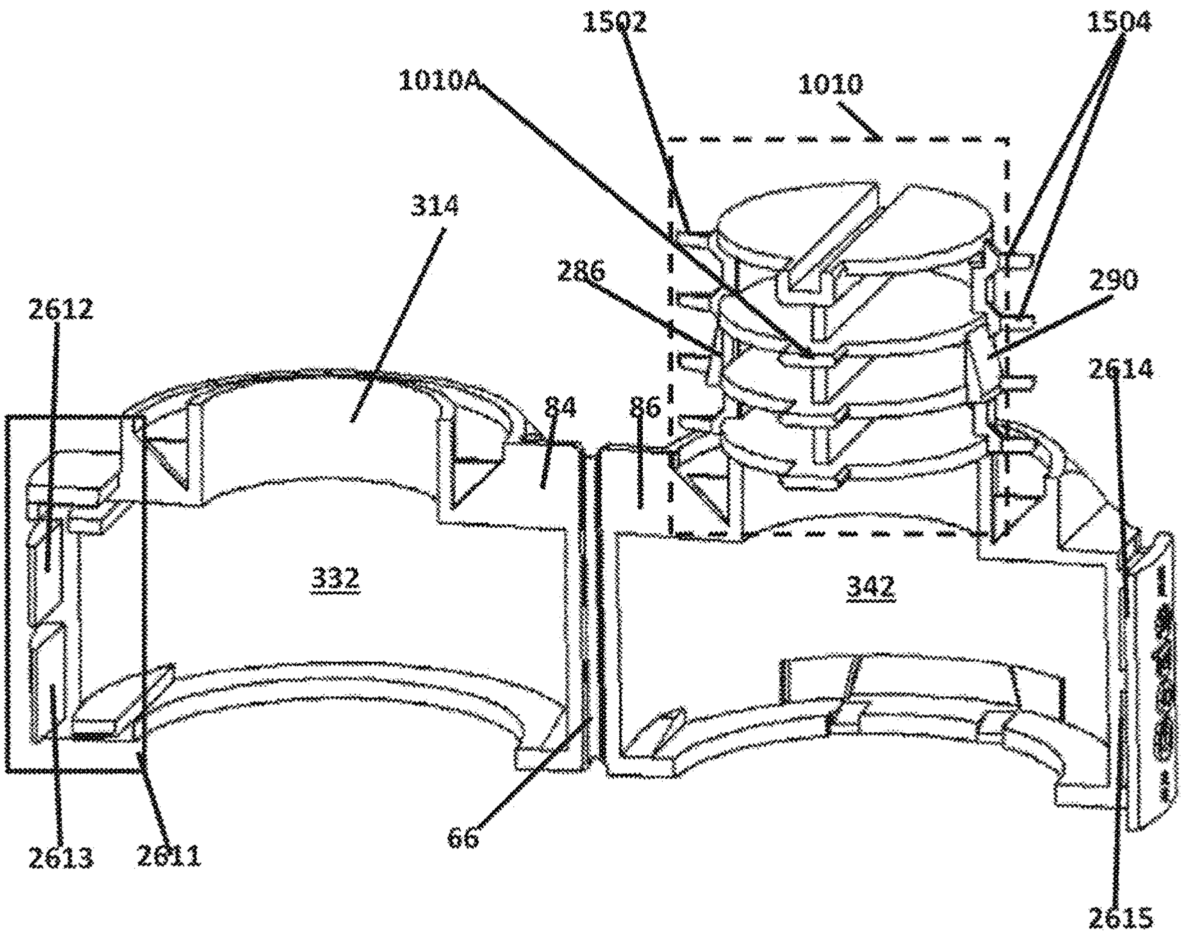
FIG. 15 illustrates more details of the second embodiment of the clam shell cover cap device housing.
Figure 16A:
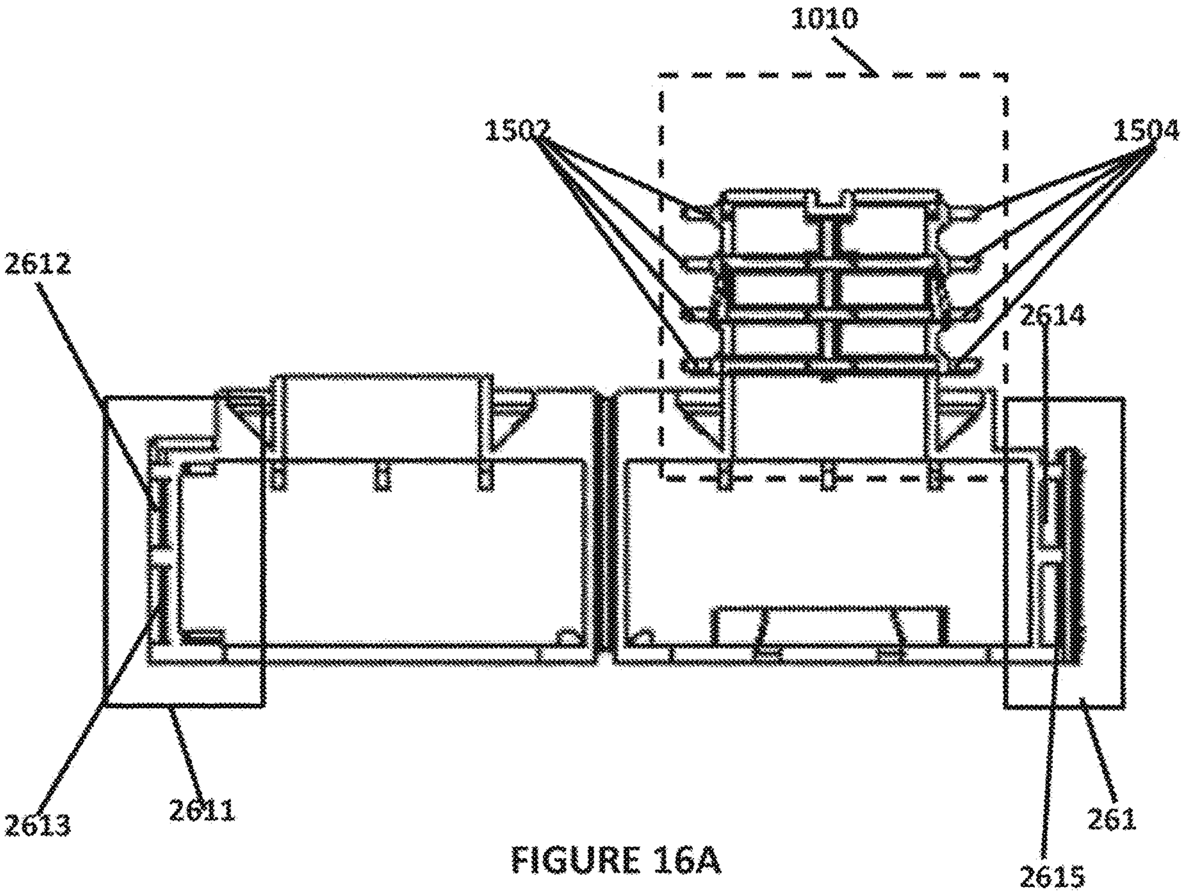
FIGS. 16A and 16B illustrate further details of the second embodiment of the clam shell cover cap device housing.
Figure 16B:
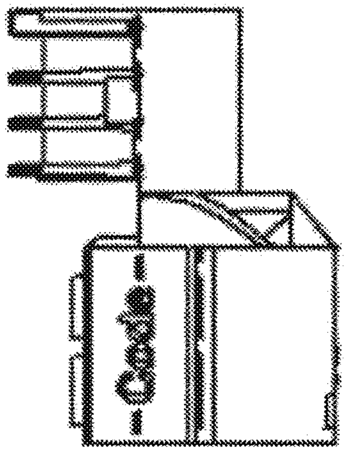
Figure 17:
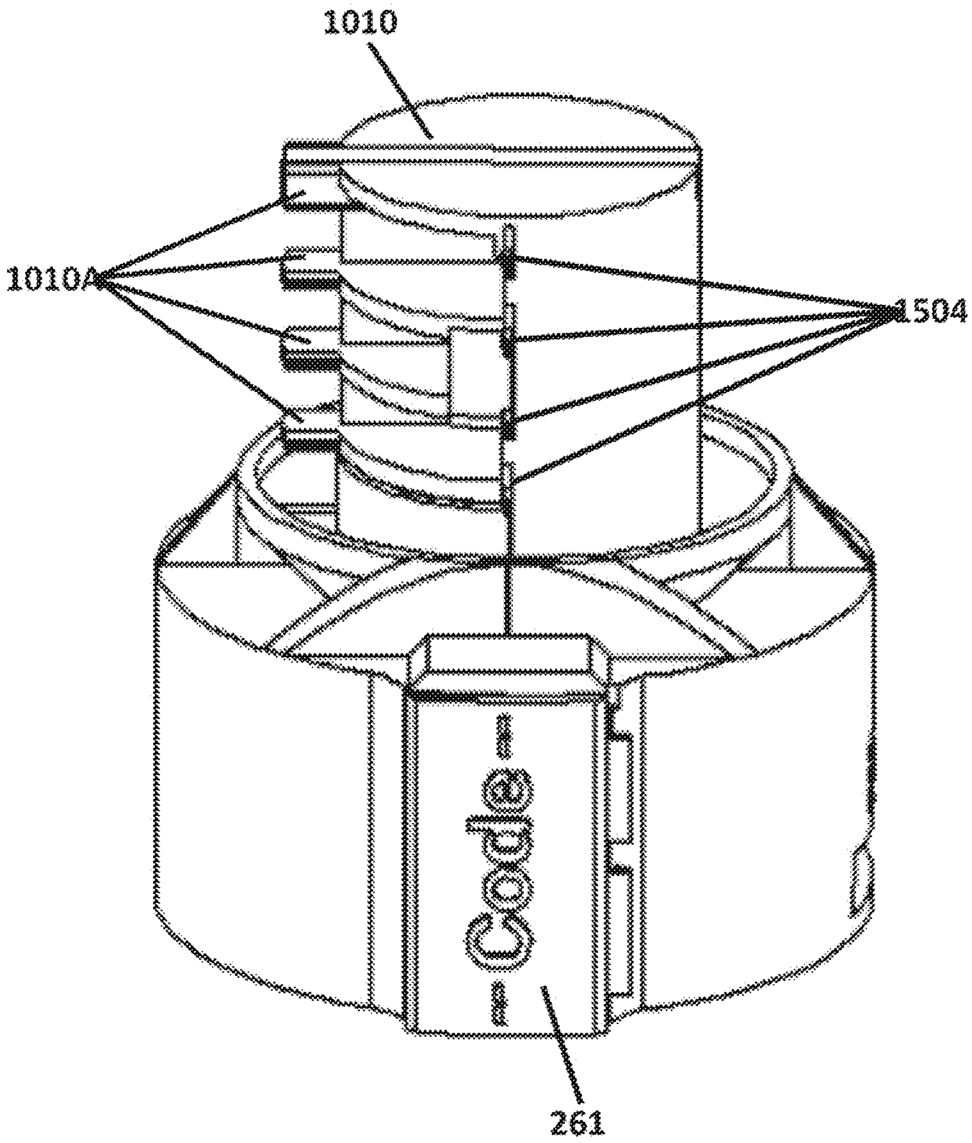
FIG. 17 is a front view of the second embodiment of the clam shell cover cap device housing with the plurality of wheels removed.

FIGS. 15 and 16A-16B illustrate more details of the second embodiment of the clam shell cover cap device housing 1004 and in particular the first and second portions of the housing whose ends meet opposite the hinge 66 like the first embodiment. This embodiment has the one or more tongue portions 2612, 2613 on the first portion and the one cavities 2614, 2615 in the second portion that has the indicator element 261. Like elements in this embodiment use like reference numbers and are the same as for the first embodiment including the tabs 110A (one for each wheel) that interact with the cutout region 47 of each wheel as described above and the catches 286, 290.

In addition, this second embodiment has a set of extensions (tension wipers) 1502, 1504 on each side of the wheel carriage 1010 with one tension wiper on each side of the wheel carriage for each wheel as shown in FIGS. 15 and 16A-16B. Each wheel 46A-46D as shown in FIG. 18A may further include a set of slots 1802, 1804 and one or more nubs/indents 1806 at various locations around an inner circumference of the wheel. Thus, as shown in FIG. 18A, a location of each symbol on the wheel has a slot 1802, 1804 or a nub/indents 1806 on the inner circumference of the wheel. The slot or nub/indent adjacent each symbol interacts with the extensions 1502, 1504 to cause the wheel to click as it is rotated to each symbol. For example, if the user rotated the wheel through all of the symbols on the wheel, the wheel would click at the location of each symbol on the wheel. The slots 1802, 1804 in each wheel also allow the tension wiper/extension 1502, 1504 to pass though each number wheel 46A-46D when assembled.

Furthermore, the slots 1802, 1804 allow the tension wiper/extensions 1502, 1504 to pass through each number wheel 46A-46D when unlocked and the number wheels are lifted up. When unlocked, the tension wipers/extensions 1502, 1504 align with the slots 1802 and 1804 and wheels 46A-46D are lifted up and held in the correct position when the housing 2000 is in the up and open position. Each extension may be made of plastic and be flexible so that it can be bent and then click into the slot in the wheel. Each set of tension wipers/extensions 1502, 1504 interact with each wheel slot 1802, 1804 (shown in FIGS. 18A-C) to cause the wheel to click as it is rotated as described above.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method of providing a securing system comprising:

providing a bottle, the bottle having a lip; and providing a clam shell cover cap device, the clam shell cover cap device comprising a housing having a first portion, a second portion, and a hinge, the first portion having a first retaining lip, the second portion having a second retaining lip, and the hinge coupling the first portion to the second portion, the housing configurable to an open housing position and a closed housing position, wherein the housing is configured to lock in the closed housing position;

wherein the housing is further configured to fit around the lip when the housing is in the closed housing position, the first retaining lip and the second retaining lip configured to resist removal of the housing from the bottle when the housing is in the closed housing position;

wherein the clam shell cover cap device further comprises at least one wheel coupled to the housing, the at least one wheel having a plurality of symbols and a particular symbol is associated with an unlock code;

wherein the housing is configured to unlock from the closed housing position and permit configuration to the open housing position following rotation of the at least one wheel such that the particular symbol is in an unlock position; and wherein in the open housing position, the first portion is movable relative to the second portion to permit removal of the housing from the bottle.

2. The method of claim 1 further comprising attaching the clam shell cover device to the bottle by moving the housing to the closed housing position when the housing is around the lip.

3. The method of claim 2 further comprising providing the unlock code.

4. The method of claim 3 further comprising selecting the unlock code.

5. The method of claim 3, wherein the unlock code is preset.

6. The method of claim 5, wherein the unlock code is not resettable.

7. The method of claim 1 wherein the clam shell cover cap device further comprises an indicator of the location to enter the unlock code.

8. The method of claim 7 further comprising rotating the wheel so that the particular symbol is aligned with the indicator.

9. A method of providing a securing system comprising:

providing a bottle, the bottle having a lip;

providing a clam shell cover cap device having a housing, the housing having first and second portions connected to each other by a hinge, the housing configured to fit around the lip when the housing is in a closed housing position, wherein the second portion of the housing is configured to rotate relative to the first portion of the housing; and providing an unlock code associated with a first particular symbol of a first plurality of symbols disposed on a first wheel, a second particular symbol of a second plurality of symbols disposed on a second wheel, and a third particular symbol of a third plurality of symbols disposed on a third wheel, wherein the first wheel, the second wheel, and the third wheel are coupled to the housing, wherein the housing is configured to open from the closed housing position following rotation of the first wheel, the second wheel, and the third wheel such that the first particular symbol is in a first unlock position, the second particular symbol is in a second unlock position, and the third particular symbol is in a third unlock position.

10. The method of claim 9 wherein the clam shell cover cap device further comprises an indicator to align the first particular symbol, the second particular symbol, and the third particular symbol in accordance with the unlock code.

11. The method of claim 10 further comprising attaching the clam shell cover device to the bottle by moving the housing to the closed housing position to secure the housing around the lip.

12. The method of claim 10 further comprising selecting the unlock code.

13. The method of claim 10 wherein the unlock code is preset.

14. The method of claim 13 wherein the unlock code is not resettable.

15. The method of claim 10 further comprising:

aligning the first particular symbol, the second particular symbol, and the third particular symbol with the indicator in accordance with the unlock code; and opening the housing from the closed housing position.

16. A method, comprising:

providing a bottle having a lip;

providing a clam shell cover cap device having a housing, the housing having first and second portions connected to each other by a hinge at a first side of the first portion and a first side of the second portion, the housing configured to fit around the lip, wherein a second side of the first portion of the housing is configured to engage a second side of the second portion of the housing; and providing an unlock code associated with a first particular symbol of a first plurality of symbols disposed on a first wheel, a second particular symbol of a second plurality of symbols disposed on a second wheel, and a third particular symbol of a third plurality of symbols disposed on a third wheel, wherein the first wheel, the second wheel, and the third wheel are coupled to the housing, wherein the housing is configured to lock in a closed housing position with the second side of the first portion of the housing is engaged with the second side of the second portion of the housing, and wherein the housing is configured to unlock from the closed housing position following rotation of the first wheel, the second wheel, and the third wheel such that the first particular symbol is in a first unlock position, the second particular symbol is in a second unlock position, and the third particular symbol is in a third unlock position.

17. The method of claim 16 wherein the clam shell cover cap device further comprises an indicator to align the first particular symbol, the second particular symbol, and the third particular symbol in accordance with the unlock code.

18. The method of claim 17 further comprising attaching the clam shell cover device to the bottle by moving the housing to the closed housing position to secure the housing around the lip.

19. The method of claim 15 further comprising selecting the unlock code.

20. The method of claim 16 further comprising:

aligning the first particular symbol, the second particular symbol, and the third particular symbol with the indicator in accordance with the unlock code; and opening the housing from the closed housing position.

* * * * *